US012608102B2

(12) United States Patent
Ku et al.

(10) Patent No.: US 12,608,102 B2
(45) Date of Patent: Apr. 21, 2026

(54) DISPLAY DEVICE AND TOUCH DRIVING METHOD

(71) Applicant: SAMSUNG DISPLAY CO., LTD., Yongin-si (KR)

(72) Inventors: Ja Seung Ku, Yongin-si (KR); Jin Woo Kim, Yongin-si (KR); Jin Taek Hong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/457,419

(22) Filed: Aug. 29, 2023

(65) Prior Publication Data

US 2024/0281090 A1     Aug. 22, 2024

(30) Foreign Application Priority Data

Feb. 21, 2023     (KR) ........................ 10-2023-0023058

(51) Int. Cl.
*G06F 3/041* (2006.01)
*G06F 3/044* (2006.01)

(52) U.S. Cl.
CPC ........ *G06F 3/04166* (2019.05); *G06F 3/0412* (2013.01); *G06F 3/0418* (2013.01); *G06F 3/044* (2013.01)

(58) Field of Classification Search
CPC .. G06F 3/04166; G06F 3/0412; G06F 3/0418; G06F 3/044
See application file for complete search history.

(56) References Cited

U.S. PATENT DOCUMENTS

| | | | |
|---|---|---|---|
| 9,569,035 B1 | 2/2017 | Lee et al. | |
| 10,572,055 B2 | 2/2020 | Shin | |
| 2016/0224164 A1* | 8/2016 | Huang | G06F 3/044 |
| 2016/0231848 A1* | 8/2016 | Lin | G06F 1/3262 |
| 2017/0192597 A1* | 7/2017 | Kang | G06F 1/3262 |
| 2017/0285865 A1* | 10/2017 | Uehara | G06F 3/0445 |
| 2022/0147185 A1* | 5/2022 | Kim | G06F 3/0446 |
| 2022/0187941 A1* | 6/2022 | Park | G06F 3/0383 |
| 2023/0067179 A1* | 3/2023 | Kim | G06F 1/1641 |

FOREIGN PATENT DOCUMENTS

| | | |
|---|---|---|
| KR | 10-2018-0003369 | 1/2018 |
| KR | 10-2021-0079999 | 6/2021 |
| KR | 10-2390164 | 4/2022 |
| KR | 10-2489286 | 1/2023 |

* cited by examiner

*Primary Examiner* — Chun-Nan Lin
(74) *Attorney, Agent, or Firm* — F. CHAU & ASSOCIATES, LLC

(57) ABSTRACT

A display device includes a touch panel including touch electrodes and a touch controller. The touch controller provides a driving signal to the touch electrodes and detects a touch and a touch position by sensing a change in values of capacitance formed between the touch electrodes and a common electrode. The touch controller includes a first touch driving IC corresponding to first touch electrodes in a first sensing area and a second touch driving IC corresponding to second touch electrodes included in a second sensing area. A first driving signal provided to the first touch electrodes from the first touch driving IC and a second driving signal provided to the second touch electrodes from the second touch driving IC have different frequencies.

26 Claims, 16 Drawing Sheets

FIG. 1

SSD: 120, 220

FIG. 7A

|  | FREQUENCY OF FIRST DRIVING SIGNAL | FREQUENCY OF SECOND DRIVE SIGNAL |
|---|---|---|
| FREQUENCY SET 1 | frq1 | frq2 |
| FREQUENCY SET 2 | frq3 | frq4 |
| FREQUENCY SET 3 | frq5 | frq6 |
| FREQUENCY SET 4 | frq7 | frq8 |
| FREQUENCY SET 5 | frq9 | frq10 |
| ⋮ | ⋮ | ⋮ |

FIG. 7B

|  | FREQUENCY CHANGE RANGE |
|---|---|
| set 1 | 0.01~0.1kHz |
| set 2 | 0.1~1 kHz |
| set 3 | 1~10 kHz |
| set 4 | 10~100 kHz |

FIG. 8A

DISPLAY DEVICE AND TOUCH DRIVING METHOD

CROSS-REFERENCE TO RELATED APPLICATION

This application claims priority to and the benefit of Korean Patent Application No. 10-2023-0023058, filed in the Korean Intellectual Property Office on Feb. 21, 2023, the entire contents of which are herein incorporated by reference.

BACKGROUND OF THE INVENTION

1. Field of the Invention

One or more embodiments described herein relate to a display device and a touch driving method.

2. Description of the Related Art

A variety of display devices have been developed to provide information to users. Examples include liquid crystal display devices and organic light emitting display devices. Many display devices include a touch panel which sense inputs in the form of a touch from a user's finger, stylus, or pen. In display devices of this type, a driving signal supplied to touch electrodes of the touch panel may introduce noise in the display device, which deteriorates display quality. Additionally, signals for displaying an image on the display device may introduce noise on the touch panel.

For large display devices, a large number of touch electrodes are disposed on one touch panel. Accordingly, touch driving may be controlled using a plurality of touch driving ICs. However, electromagnetic interference (EMI) may be an issue between touch electrodes receiving driving signals from different touch driving ICs.

SUMMARY OF THE INVENTION

According to one or more embodiments, a display device is provided which reduces EMI that may occur between touch electrodes receiving driving signals from different touch driving ICs. These and/or other improvements and benefits are provided in the embodiments described below.

An embodiment of the present disclosure provides a display device including: a touch panel including touch electrodes; and a touch controller configured to provide a driving signal to the touch electrodes and detects a touch or not and a touch position by sensing a change in values of capacitance formed between the touch electrodes and a common electrode. The touch controller includes a first touch driving IC corresponding to first touch electrodes included in a first sensing area among the touch electrodes, and a second touch driving IC corresponding to second touch electrodes included in a second sensing area among the touch electrodes. A first driving signal provided to the first touch electrodes from the first touch driving IC and a second driving signal provided to the second touch electrodes from the second touch driving IC have different frequencies.

A frequency of the first driving signal and a frequency of the second driving signal may be changed at predetermined time points.

The value of the capacitance corresponding to each of the touch electrodes may be detected for each frame period, and the frequency of the first driving signal and the frequency of the second driving signal may be changed every time one frame period ends.

The frequency of the first driving signal may be changed whenever touch detection is completed for one of the first touch electrodes, and the frequency of the second driving signal may be changed whenever touch detection is completed for one of the second touch electrodes.

The touch detection for one of the first touch electrodes or the touch detection for one of the second touch electrodes may be performed a predetermined number of times for each touch electrode, and the frequency of the first driving signal and the frequency of the second driving signal may be respectively changed each time the touch detection for each touch electrode is completed once.

Each of the first touch driving IC and the second touch driving IC may include a touch driver configured to generate one of the first driving signal and the second driving signal to provide it to the touch electrodes, and a touch detector configured to detect the values of the capacitance.

The touch controller may include a frequency controller configured to control the frequencies of the first driving signal and the second driving signal, and the frequency controller is configured to provide a first frequency change signal to the touch driver of the first touch driving IC at each predetermined time point to control the touch driver of the first touch driving IC in order to change the frequency of the first driving signal, and to provide a second frequency change signal to the touch driver of the second touch driving IC at each predetermined time point to control the touch driver of the second touch driving IC in order to change the frequency of the second driving signal.

The first touch driving IC may further include a frequency controller configured to provide a first frequency change signal to the touch driver of the first touch driving IC at each predetermined time point to control the touch driver of the first touch driving IC in order to change the frequency of the first driving signal. The frequency controller is configured to provide a second frequency change signal to the touch driver of the second touch driving IC at each predetermined time point to control the touch driver of the second touch driving IC in order to change the frequency of the second driving signal.

The first touch driving IC may further include a frequency information storage portion including a plurality of frequency sets, wherein each of the plurality of frequency sets may include first frequency information and second frequency information that are different from each other. The frequency controller may receive first frequency information and second frequency information included in one of the plurality of frequency sets at each predetermined time point and may generate the first frequency change signal according to the first frequency information and may generate the second frequency change signal according to the second frequency information.

The one frequency set provided to the frequency controller may be selected randomly or in a predetermined order from among the plurality of frequency sets.

Intervals between frequencies indicated by the first frequency information included in each of the plurality of frequency sets may be the same, and intervals between frequencies indicated by the second frequency information included in each of the plurality of frequency sets may be the same. The intervals between the frequencies indicated by the first frequency information and the intervals between the frequencies indicated by the second frequency information may be different from each other.

Another embodiment provides a touch driving method including: providing driving signals to touch electrodes included in a touch panel; and detecting a touch or not and a touch position by sensing a change in values of capacitance formed between the touch electrodes and a common electrode. Providing the driving signal includes providing a first driving signal to first touch electrodes included in a first sensing area among the touch electrodes, and providing a second driving signal to second touch electrodes included in a second sensing area among the touch electrodes, wherein the first driving signal and the second driving signal have different frequencies.

Detecting the touch or not and the touch position may include detecting the values of the capacitance corresponding to each of the first touch electrodes after the first driving signal is provided to the first touch electrodes and detecting the values of the capacitance corresponding to each of the second touch electrodes after the second driving signal is provided to the second touch electrodes.

The touch driving method may further include changing a frequency of the first driving signal and a frequency of the second driving signal at each predetermined time point.

Providing the driving signal to the touch electrodes and detecting the touch or not and the touch position may be performed for each frame period, and changing the frequency of the first driving signal and the frequency of the second driving signal at each predetermined time point may include changing the frequencies of the first driving signal and the second driving signal every time one frame period ends.

Changing the frequency of the first driving signal and the frequency of the second driving signal at each predetermined time point may include changing the frequency of the first driving signal whenever touch detection of one of the first touch electrodes is completed and changing the frequency of the second driving signal whenever touch detection of one of the second touch electrodes is completed.

Changing the frequency of the first driving signal and the frequency of the second driving signal at each predetermined time point may include providing a first frequency change signal that controls the first touch driver to change the frequency of the first driving signal at each predetermined time point with respect to the first touch driver that provides the first driving signal to the first touch electrodes, and providing a second frequency change signal that controls the second touch driver to change the frequency of the second driving signal at each predetermined time point with respect to the second touch driver that provides the second driving signal to the second touch electrodes.

Touch driving of the first touch electrodes may be controlled by a first touch driving IC and touch driving of the second touch electrodes may be controlled by a second touch driving IC. Providing the first frequency change signal to the first touch driver and providing of the second frequency change signal to the second touch driver may be controlled by a frequency controller included in the first touch driving IC.

The first touch driving IC may include a frequency information storage portion including a plurality of frequency sets, each of the plurality of frequency sets may include first frequency information and second frequency information that are different from each other. Changing the frequency of the first driving signal and the frequency of the second driving signal at each predetermined time point may include receiving first frequency information and second frequency information included in one of the plurality of frequency sets at each predetermined time point and generating the first frequency change signal according to the first frequency information included in the one frequency set and generating the second frequency change signal according to the second frequency information included in the one frequency set.

Receiving the first frequency information and the second frequency information included in the one frequency set may include selecting the one frequency set randomly or in a predetermined order from among the plurality of frequency sets.

According to the embodiment of the present disclosure, when a display device includes a plurality of touch driving ICs, driving signals output from the respective touch driving ICs may have different frequencies, and thus EMI that may occur between touch electrodes may be reduced.

In addition, according to the embodiment of the present disclosure, the frequency of the driving signal output from the touch driving ICs may change to a different frequency every predetermined time.

Another embodiment is a touch controller, comprising a first touch driver configured to drive touch electrodes in a first sensing area and a second touch driver configured to drive touch electrodes in a second sensing area, wherein the first touch driver is configured to drive the touch electrodes in the first sensing area based on a first driving signal and the second touch driver is configured to drive the touch electrodes in the second sensing area based on a second driving signal, the first driving signal and the second driving signal having different frequencies.

The touch controller may include a frequency controller configured to control the first touch driver to drive the touch electrodes in the first sensing area based on a first frequency, and to control the second touch driver to drive the touch electrodes in the second sensing area based on a second frequency different from the first frequency.

The frequency controller is configured to control the first touch driver and the second touch driver to change the first frequency and the second frequency, respectively, at a predetermined time. The predetermined time may correspond to detection of a touch.

The first touch driver may be configured to drive the touch electrodes in the first sensing area independently from the second touch driver driving the touch electrodes in the second sensing area.

The different frequencies of the first driving signal and the second driving signal may reduce electromagnetic interference in a display device including the touch controller.

BRIEF DESCRIPTION OF THE DRAWINGS

FIG. 1 illustrates a display device according to embodiments of the present disclosure.

FIG. 7A illustrates a frequency information storage portion according to an embodiment, and FIG. 7B illustrates a frequency information storage portion according to another embodiment.

FIG. 8A and FIG. 8B illustrate a case in which a frequency of a driving signal is changed for each frame period according to an embodiment.

DETAILED DESCRIPTION OF THE EMBODIMENTS

Figure 2:
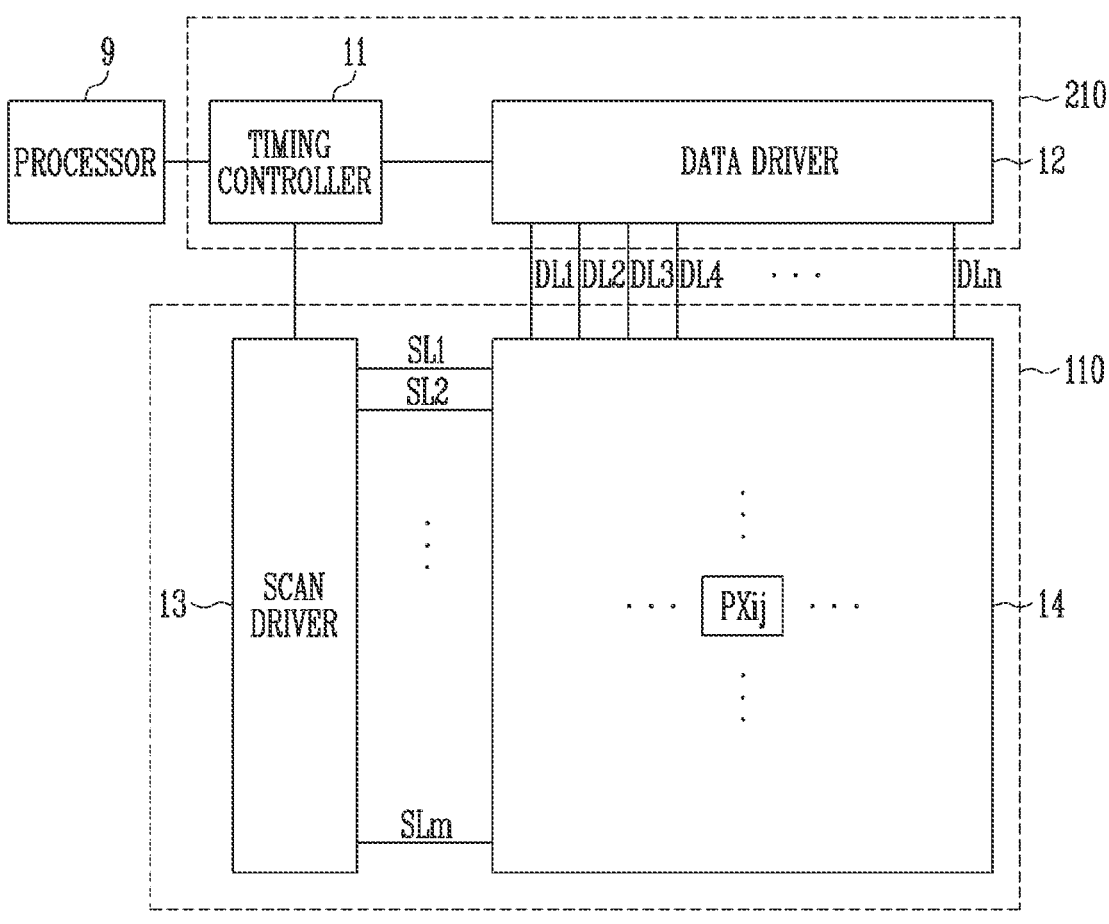
FIG. 2 illustrates embodiments of a display portion and a display driver included in the display device of FIG. 1.

Since the present disclosure may be variously modified and have various forms, embodiments will be illustrated and described in detail in the following. This, however, by no means restricts the disclosure to the specific embodiments, and it is to be understood as embracing all included in the spirit and scope of the present disclosure changes, equivalents, and substitutes.

Like reference numerals are used for like constituent elements in describing each drawing. In the accompanying drawings, the dimensions of the structure are exaggerated and shown for clarity of the present disclosure. Terms such as first, second, and the like will be used only to describe various constituent elements, and are not to be interpreted as limiting these constituent elements. The terms are only used to differentiate one constituent element from other constituent elements. For example, a first constituent element could be termed a second constituent element, and similarly, a second constituent element could be termed as a first constituent element, without departing from the scope of the present disclosure.

In the present application, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. It will be understood that when an element such as a layer, film, region, area, or substrate is referred to as being "on" another element, it can be directly on the other element or intervening elements may also be present. In addition, in the present specification, when an element of a layer, film, region, area, plate, or the like is referred to as being formed "on" another element, the formed direction is not limited to an upper direction but includes a lateral or lower direction. In contrast, when an element of a layer, film, region, area, plate, or the like is referred to as being "below" another element, it may be directly below the other element, or intervening elements may be present.

It is to be understood that, in the present application, when it is described for one constituent element (for example, a first constituent element) to be (functionally or communicatively) "coupled or connected with/to" another constituent element (for example, a second constituent element), the one constituent element may be directly coupled or connected with/to the another constituent element, or may be coupled or connected with/to through the other constituent element (for example, a third constituent element). In contrast, it is to be understood that when it is described for one constituent element (for example, a first constituent element) to be "directly coupled or connected with/to" another constituent element (for example, a second constituent element), there is no other constituent element (for example, a third constituent element) between the one constituent element and the another constituent element.

Hereinafter, with reference to accompanying drawings, embodiments of the present disclosure and others for those skilled in the art to understand the contents of the present disclosure will be described in more detail. In the description below, singular forms are to include plural forms unless the context clearly indicates only the singular.

Figure 1:
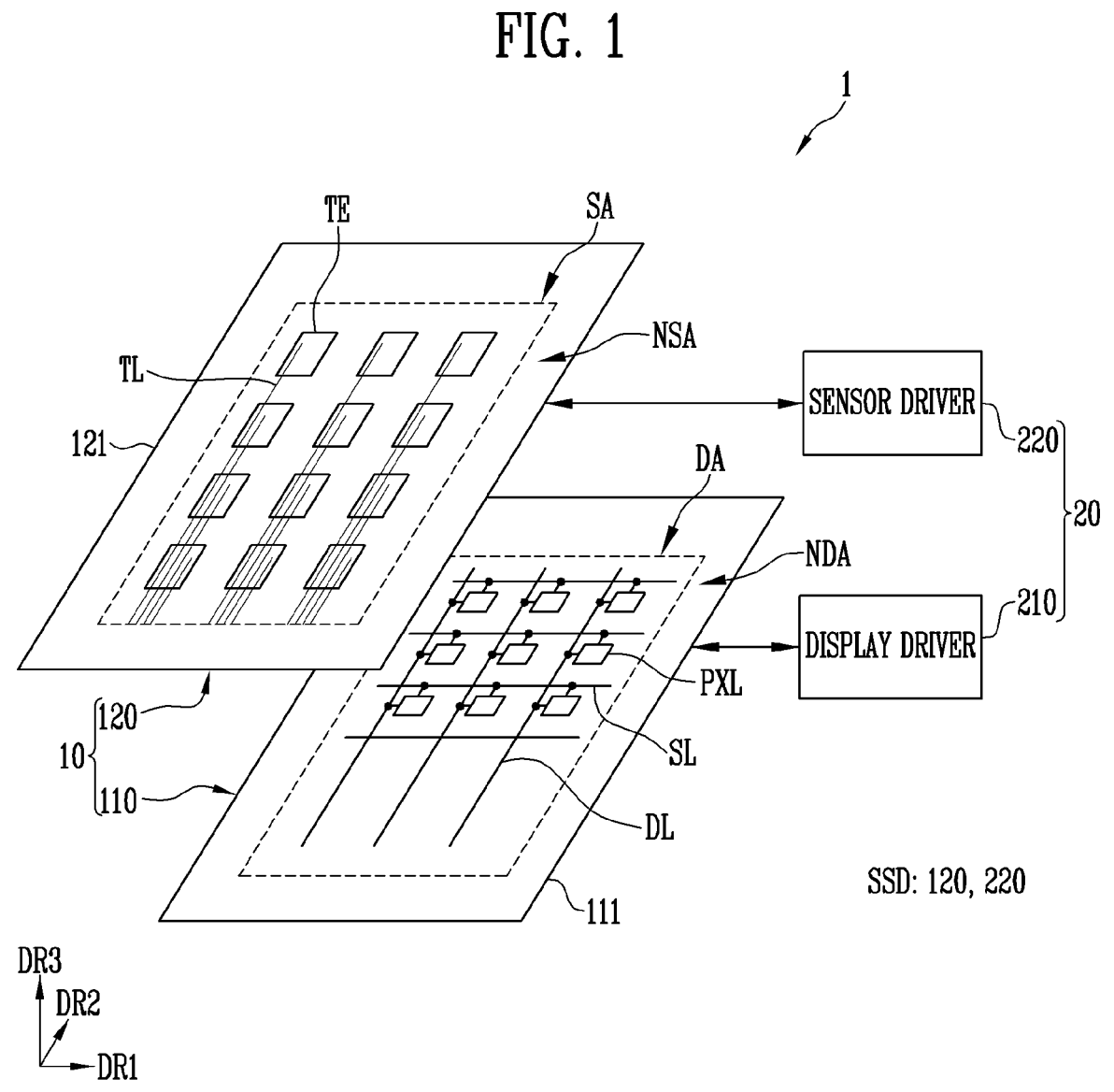

FIG. 1 illustrates a display device 1 according to embodiments of the present disclosure. Referring to FIG. 1, the display device 1 may be applied to or included in electronic devices. Examples include a computer, laptop, cellular phone, smart phone, personal digital assistant (PDA), portable multimedia player (PMP), digital TV, digital camera, portable game console, a navigation device, a wearable device, an Internet of things (IoT) device, an Internet of everything (IoE) device, an e-book, a virtual reality (VR) device, an augmented reality (AR) device, a vehicle navigation, a video phone, a surveillance system, an auto focus system, a tracking system, a motion detection system, as well as any other electronic device that includes a display device.

The display device 1 may include a panel 10 and a driving circuit portion 20 for driving the panel. The panel 10 may include a display portion 110 (or a display panel) for displaying images and a touch sensing portion 120 (or a sensor panel) for sensing external inputs which include, but are not limited to, a touch, pressure, a fingerprint, proximity, and hovering.

The panel 10 may, for example, include pixels PXL and touch electrodes TE disposed to overlap at least some of the pixels PXL. For example, the pixels PXL may display an image in units of display frame periods. For example, the touch electrodes TE may sense a user's input in units of sensing frame periods. The sensing frame period and the display frame period may be independent of each other and may be different from each other. In one embodiment, the sensing frame period and the display frame period may be synchronized, but may not be synchronized in other embodiments. The touch sensing portion 120 may include a sensor device (SSD) (or an input sensing device) together with a sensor driver 220.

According to the embodiment, the display portion 110 and the touch sensing portion 120 may be separately manufactured from each other, and then may be disposed, assembled, and/or combined so that at least one areas thereof overlap each other. In one embodiment, the display portion 110 and the touch sensing portion 120 may be integrally manufactured. For example, the touch sensing portion 120 may be directly formed on at least one substrate (for example, an upper and/or lower substrate of a display panel, or a thin film encapsulation layer) forming the display portion 110 or other insulation layers or various functional films (for example, an optical layer or a passivation layer).

In FIG. 1, the touch sensing portion 120 is shown to be disposed on a front surface (for example, an upper surface on which an image is displayed) of the display portion 110, but the position of the touch sensing portion 120 may be different in other embodiments. For example, in one embodiment, the touch sensing portion 120 may be disposed on a rear surface or respective surfaces of the display portion 110. In one embodiment, the touch sensing portion 120 may be disposed on at least one edge area of the display portion 110.

The display portion 110 may include a display panel 111 and a plurality of pixels PXL formed on the display panel

7

111. The pixels PXL may be disposed in a display area DA of the display panel 111. The display panel 111 may include the display area DA in which an image is displayed and a non-display area NDA outside the display area DA. In some embodiment, the display area DA may be disposed in a central area of the display portion 110, and the non-display area NDA may be disposed in an edge, border, or bezel area of the display portion 110 so as to partially or completely surround the display area DA. The display panel 111 may be a rigid substrate or a flexible substrate, and its material or physical properties are not particularly limited. For example, the display panel 111 may be a rigid substrate made of glass or tempered glass, or a flexible substrate formed of a thin film made of plastic or a metallic material.

The display area DA includes scan lines SL and data lines DL, and pixels PXL connected to respective ones of the scan lines SL and the data lines DL. The pixels PXL may be selected by a scan signal having a turn-on level supplied from the scan lines SL. The pixels PXL may be selected to receive a data signal from the data lines DL, and may emit light with luminance corresponding to the data signal. Accordingly, an image corresponding to the data signal may be displayed in the display area DA. In the present disclosure, the structure and driving method of pixels PXL are not particularly limited. For example, respective pixels PXL may be implemented as pixels to which various structures and driving methods are applied.

In the non-display area NDA, various wires connected to the pixels PXL of the display area DA and/or internal circuit portions may be disposed. For example, in the non-display area NDA, a plurality of wires for supplying various power sources and control signals to the display area DA may be disposed, and in addition a scan driver and the like may be further disposed.

In the present disclosure, the type of the display portion 110 is not particularly limited. For example, the display portion 110 may be implemented as a self-light emitting type display panel such as an organic light emitting display panel. However, when the display portion 110 is implemented as a self-light emitting type, each of the pixels PXL is not limited to a case where only an organic light emitting element is included. For example, the light emitting element of each of the pixels PXL may include an organic light emitting diode, an inorganic light emitting diode, and a quantum dot/well light emitting diode. In some embodiments, a plurality of light emitting elements may be provided in each of the pixels PXL. In this case, the plurality of light emitting elements may be connected in series, in parallel, or in series/parallel. In one embodiment, the display portion 110 may be implemented as a non-light emitting type of display panel such as a liquid crystal display panel. When the display portion 110 is implemented as a non-light emitting type, the display device 1 may additionally include a light source such as a backlight unit.

The touch sensing portion 120 may include a touch panel 121 and a plurality of touch electrodes TE formed on the touch panel 121. The touch electrodes TE may be disposed in a sensing area SA on the touch panel 121. The touch electrodes TE may be connected to touch lines TL. When the touch sensor is configured to implement a self-capacitance method, the touch electrodes TE and the touch lines TL may be connected in a one-to-one correspondence.

The touch panel 121 may include a rigid or flexible substrate, and may be configured to include at least one insulating film. In addition, the touch panel 121 may include a transparent or translucent transmissive substrate, but is not limited thereto. In the present disclosure, the material and physical properties of the touch panel 121 are not particularly limited. For example, the touch panel 121 may be a rigid substrate made of glass or tempered glass, or a flexible substrate formed of a thin film made of plastic or a metallic material. In some embodiments, the touch panel 121 may use at least one substrate of the display portion 110 (for example, the display panel 111, an encapsulation substrate, and/or a thin film encapsulation layer), or at least one layer of insulation film or functional film disposed on an inner and/or outer surface of the display portion 110.

The touch panel 121 may include a sensing area SA capable of sensing an external input and a non-sensing area NSA outside the sensing area SA. In some embodiments, the sensing area SA may be disposed to overlap at least one area of the display area DA. For example, the sensing area SA may be set as an area corresponding to the display area DA (for example, an area overlapping the display area DA), and the non-sensing area NSA may be set as an area corresponding to the non-display area NDA (for example, an area overlapping the non-display area NDA). In this case, when an external input is provided on the display area DA, the external input may be detected through the touch sensing portion 120.

The sensing area SA may be an area capable of reacting to an external input (that is, an active area of a sensor). To this end, the touch electrodes TE for sensing an external input may be disposed in the sensing area SA. For example, the touch electrodes TE may be disposed in a matrix form extending in a first direction DR1 and a second direction DR2 orthogonal to the first direction DR1. In one embodiment, the first direction DR1 and the second direction DR2 may not be orthogonal. In another embodiment, the touch electrodes TE may be circularly, elliptically, or obliquely disposed, but is not necessarily disposed in the matrix form. Each of the touch electrodes TE may have various shapes such as, but not limited to, a quadrangular shape, a triangular shape, a circular shape, and a mesh shape, and the shape of each of the touch electrodes TE is not particularly limited.

In some embodiments, each of the touch electrodes TE may have conductivity by including at least one of a metallic material, a transparent conductive material, or various other conductive materials. For example, the touch electrodes TE may include at least one of metallic materials such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof. In this case, the touch electrodes TE may be configured in a mesh form. In addition, the touch electrodes TE may include at least one of transparent conductive materials such as a silver nanowire (AgNW), an indium tin oxide (ITO), an indium zinc oxide (IZO), an indium gallium zinc oxide (IGZO), an antimony zinc oxide (AZO), an indium tin zinc oxide (ITZO), a zinc oxide (ZnO), a tin oxide ($SnO_2$), a carbon nano tube, or a graphene. In addition, the touch electrodes TE may have conductivity by including at least one of various conductive materials. In addition, each of the touch electrodes TE may be made of a single layer or multilayer, and the cross-sectional structure thereof is not particularly limited.

The touch lines TL may be disposed on the same layer as the touch electrodes TE. In one embodiment, the touch lines TL may be separated from the touch electrodes TE by an insulating layer and disposed on different layers. In this case, the touch lines TL may be connected to the corresponding touch electrodes TE through a contact hole of the insulating layer. The touch lines TL may be made of various conductive materials and, for example, may be made of the same material as or different material from the touch electrodes TE.

The driving circuit portion 20 may include a display driver 210 for driving the display portion 110 and a sensor driver 220 for driving the touch sensing portion 120. Each of the display driver 210 and the sensor driver 220 may be implemented as an integrated circuit (IC).

The display driver 210 may be electrically connected to the display portion 110 to drive the pixels PXL. For example, the display driver 210 may provide data signals to the pixels PXL. In the embodiment, the display driver 210 may include a data driver and a timing controller, and a scan driver may be separately mounted in the non-display area NDA of the display portion 110 (e.g., see FIG. 2). In one embodiment, the display driver 210 may include all or at least some of the data driver, the timing controller, or the scan driver.

The sensor driver 220 may be electrically connected to the touch sensing portion 120 to drive the touch sensing portion 120. For example, the sensor driver 220 may be connected to the touch electrodes TE through the touch lines TL. The sensor driver 220 may include a sensor receiver (or a receiver). In some embodiments, the sensor driver 220 may further include a sensor transmitter (or a transmitter). The sensor transmitter and the sensor receiver may be integrated into one IC, but may be disposed in different ICs in another embodiment.

FIG. 2 illustrates an embodiment of the display portion 110 and the display driver 210 included in the display device of FIG. 1.

Referring to FIG. 1 and FIG. 2, the display driver 210 may include a data driver 12 and a timing controller 11, and the display portion 110 may include a scan driver 13. As described above, the respective functional portions may be integrated into one IC or into a plurality of ICs, or may be mounted on the display panel 111 according to specifications of the display device 1.

The timing controller 11 may receive grayscales, control signals and timing signals for each frame from a processor 9. The processor 9 may correspond to a graphics processing unit (GPU), a central processing unit (CPU), an application processor (AP), or the like. The control or timing signals may include a vertical synchronization signal, a horizontal synchronization signal, a data enable signal, and the like.

Each cycle of the vertical synchronization signal may correspond to each frame period. Each cycle of the horizontal synchronization signal may correspond to each horizontal period. The grayscales may be supplied in units of horizontal line in each horizontal period in response to a pulse of an enable level of the data enable signal. A horizontal line may correspond to pixels connected to the same scan line and light emitting line (for example, pixel row).

The timing controller 11 may render grayscale data to correspond to the specifications of the display device 1. For example, the processor may provide red grayscale data, green grayscale data, and blue grayscale data for each unit dot. For example, when a pixel portion 14 has an RGB stripe structure, a pixel may correspond to each grayscale in a one-to-one manner. In this case, rendering of grayscales may not be necessary. However, for example, when the pixel portion 14 has a PENTILE™ structure, since adjacent unit dots share a pixel, the pixel may not correspond to each grayscale in a one-to-one manner. In this case, rendering of grayscales may be performed. Rendered or non-rendered grayscales may be provided to the data driver 12. In addition, the timing controller 11 may provide a data control signal to the data driver 12 and may provide a scan control signal to the scan driver 13.

The data driver 12 may generate data voltages to be provided to data lines (DL1, DL2, DL3, DL4, . . . , DLn) based on the received grayscales and the data control signals received from the timing controller 11. Here, n may be a positive integer.

The scan driver 13 may generate scan signals to be provided to scan lines (SL1, SL2, . . . , SLm) based on a scan control signal (for example, a clock signal, a scan start signal, etc.) received from the timing controller 11. Here. m may be a positive integer. The scan driver 13 may sequentially supply scan signals having a turn-on level pulse to the scan lines SL1 to SLm. The scan driver 13 may include scan stages configured in a form of a shift register. The scan driver 13 may generate the scan signals through a method of sequentially transmitting a scan start signal (which is a pulse type of a turn-on level) to a next scan stage according to control of the clock signal.

The pixel portion 14 includes the pixels. Respective pixels may be connected to a corresponding data line and scan line. For example, a pixel PXij may be connected to an i-th scan line and a j-th data line. The pixels may include pixels that emit first color light, pixels that emit second color light, and pixels that emit third color light. The first color, the second color, and the third color may be different colors. For example, the first color, the second color, and the third color may be red, green, or blue. In one embodiment, the first color, the second color, and the third color may be magenta, cyan, and yellow or another combination of colors.

Figure 3:
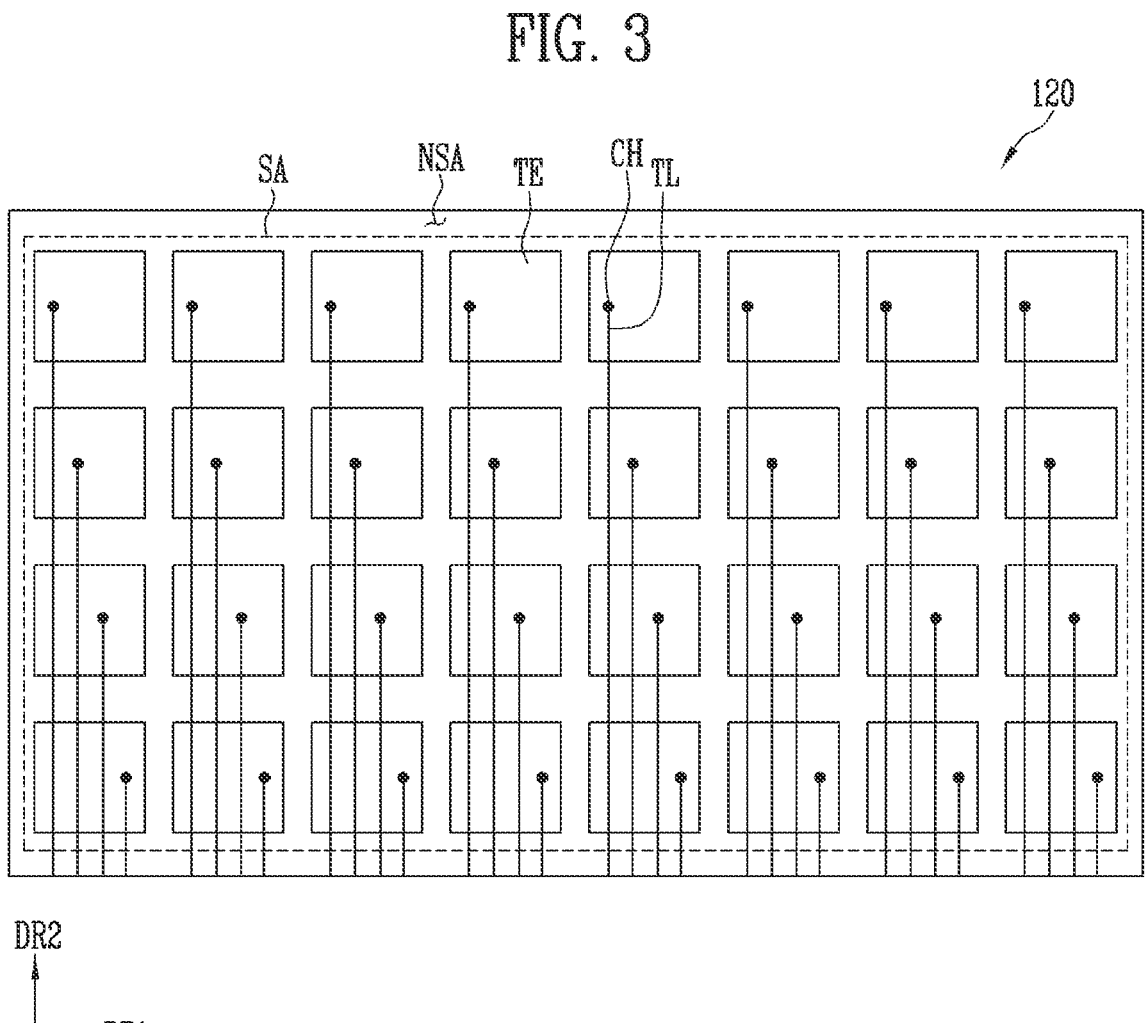
FIG. 3 illustrates an embodiment of a touch sensing portion included in the display device of FIG. 1.

FIG. 3 illustrates an embodiment of the touch sensing portion 120 included in the display device of FIG. 1. The touch sensing portion 120 according to the embodiment may obtain coordinate information in a self dot capacitance method.

Referring to FIG. 1 and FIG. 3, the touch sensing portion 120 may include the sensing area SA (capable of sensing a touch input) and the non-sensing area NSA partially or completely surrounding at least a portion of the sensing area SA. According to the embodiment, the sensing area SA may be disposed to correspond to the display area DA of the display panel 111, and the non-sensing area NSA may be disposed to correspond to the non-display area NDA of the display panel 111. For example, the sensing area SA of the touch sensing portion 120 may overlap the display area DA of the display panel 111 in the third direction DR3, and the non-sensing area NSA of the touch sensing portion 120 may overlap the non-display area NDA of the display panel 111 in the third direction DR3.

The touch sensing portion 120 may include the touch electrodes TE disposed to be spaced apart from each other and the touch lines TL connected to the touch electrodes TE. In the embodiment, the touch electrodes TE and the touch lines TL may be connected in one-to-one correspondence.

In one embodiment, the touch electrodes TE may be arranged in a matrix form. For example, the touch electrodes TE may have a quadrangular shape, but are not limited thereto. In other embodiments, the touch electrodes TE may have various shapes such as, but not limited to, a polygonal shape, an elliptical shape, and a circular shape. In some embodiments, the touch electrodes TE may have two or more shapes. For example, some touch electrodes TE may be formed in a quadrangular shape, and other touch electrodes TE may be formed in a different (e.g., circular) shape.

The touch electrodes TE may be disposed in the form of islands (e.g., separated regions) that are spaced apart from each other along the first direction DR1 and the second direction DR2. The touch electrodes TE may form an electrode row in the first direction DR1 and may form an electrode column in the second direction DR2.

In the embodiment of FIG. 3, the touch electrodes TE are shown in a 4×8 matrix for better understanding and ease of description. In this example case, it is shown that 4 touch electrodes TE are disposed along the second direction DR2 and 8 touch electrodes TE are disposed along the first direction DR1. However, this is only an example, and the number and disposition of the touch electrodes TE may be variously changed to correspond, for example, to the size of display device 1.

The number of the touch lines TL included in one electrode column may be disposed in one-to-one correspondence with the number of touch electrodes TE included in one electrode column. For example, as shown in the example embodiment of FIG. 7, when four touch electrodes TE are included in one electrode column, the number of the touch lines TL may be four.

The touch lines TL according to the embodiment of the present disclosure may extend in second direction DR2 and arranged along first direction DR1. One end of the touch lines TL may be connected to the touch electrodes TE through a contact hole CH, and the other end thereof may be electrically connected to touch signal pads.

Figure 4:
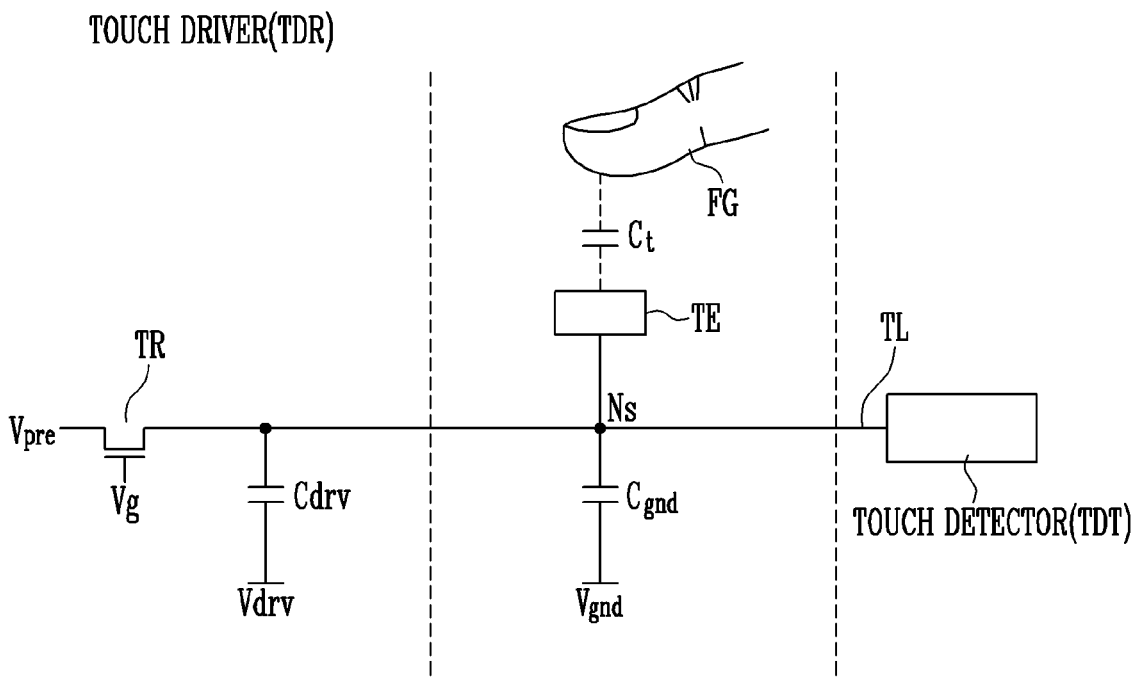
FIG. 4 illustrates a touch driving method according to an embodiment.

FIG. 4 is a drawing for explaining a touch driving method according to an embodiment.

Referring to FIG. 4, touch driving may include an operation in which a touch driver TDR supplies a precharge voltage Vpre and a driving signal Vdrv to the touch electrodes TE, and an operation in which a touch detector TDT detects a touch. The operation of detecting a touch may include detecting whether or not an external touch is received and a touch position. For example, a touch driving IC (TIC) may include the touch driver TDR and the touch detector TDT. The touch driver TDR may supply the precharge voltage Vpre and the driving signal Vdrv to the touch sensing portion 120 (or the touch electrode TE), and may detect a touch position by receiving a sensing signal corresponding to the driving signal from the touch sensing portion 120 (or the touch electrode TE).

For example, a pre-charging transistor TR of the touch driver TDR may be controlled by a gate voltage Vg to apply the pre-charging voltage Vpre to the touch electrode TE. The touch sensing portion 120 of the present disclosure may include a driving signal generator in the touch driver TDR to increase touch sensitivity. Upon detecting a touch, the driving signal generator may apply the driving signal Vdrv to a driving capacitor Cdrv. In this embodiment, the driving capacitor Cdrv may be formed between a touch electrode TE as a sensing target and one or more touch electrodes adjacent to the touch electrode TE as the sensing target. In the embodiment, the driving capacitor Cdrv may be formed between a touch line TL connected to a touch electrode TE as a sensing target and a touch line connected to one or more touch electrodes adjacent to the touch electrode TE as the sensing target. In the embodiment, the driving signal Vdrv may be a pulse-type signal having a voltage level that changes.

When a finger FG touches the touch sensing portion 120 (or the touch electrode TE), a contact capacitive capacitance Ct may be generated. In one embodiment, a cover window may be disposed on the touch electrode TE, and when the finger FG touches the cover window overlapping the touch electrode TE in the thickness direction thereof, the contact capacitive capacitance Ct may be generated.

Referring to FIG. 4, depending on a voltage value applied to a common electrode, a capacitance value formed between the common electrode and the touch electrode TE may change. The touch electrodes TE may overlap at least one electrode provided in the display panel 111. For example, when the display panel 111 is an organic light emitting diode display panel, the touch electrodes TE may overlap a cathode electrode of the display panel 111. According to this embodiment, the cathode electrode of the display panel 111 may function as a common electrode. Depending on a touch ground voltage Vgnd applied to the common electrode, a capacitance value Cgnd formed between the common electrode and the touch electrode TE or a voltage of a sensing node Ns may change.

The touch detector TDT of the present disclosure may determine a contact or non-contact touch by a touch input member (for example, the finger FG) of the TE and a touch position, based on a voltage difference between when the contact capacitive capacitance Ct is generated and when it is not generated in a state in which the driving signal Vdrv is applied to the driving capacitor Cdrv.

For example, when the user's finger FG touches at least one of the touch electrodes TE, the contact capacitive capacitance Ct is generated between the finger FG and the touch electrode TE. As a result, the capacitive capacitance value Cgnd (or the voltage of the sensing node Ns) may be changed by the contact capacitive capacitance Ct. The changed capacitive capacitance value Cgnd (or the voltage of the sensing node Ns) may be transmitted to the touch detector TDT through the touch lines TL connected to the touch electrodes TE touched by the finger FG. The touch detector TDT may detect the touch position by checking the touch lines TL through which the changed capacitive capacitance value Cgnd (or the changed voltage of the sensing node Ns) is received. For example, the touch detector TDT may detect the touch position by detecting an amount of change in self-capacitance formed in the touch electrode TE.

Figure 5A:
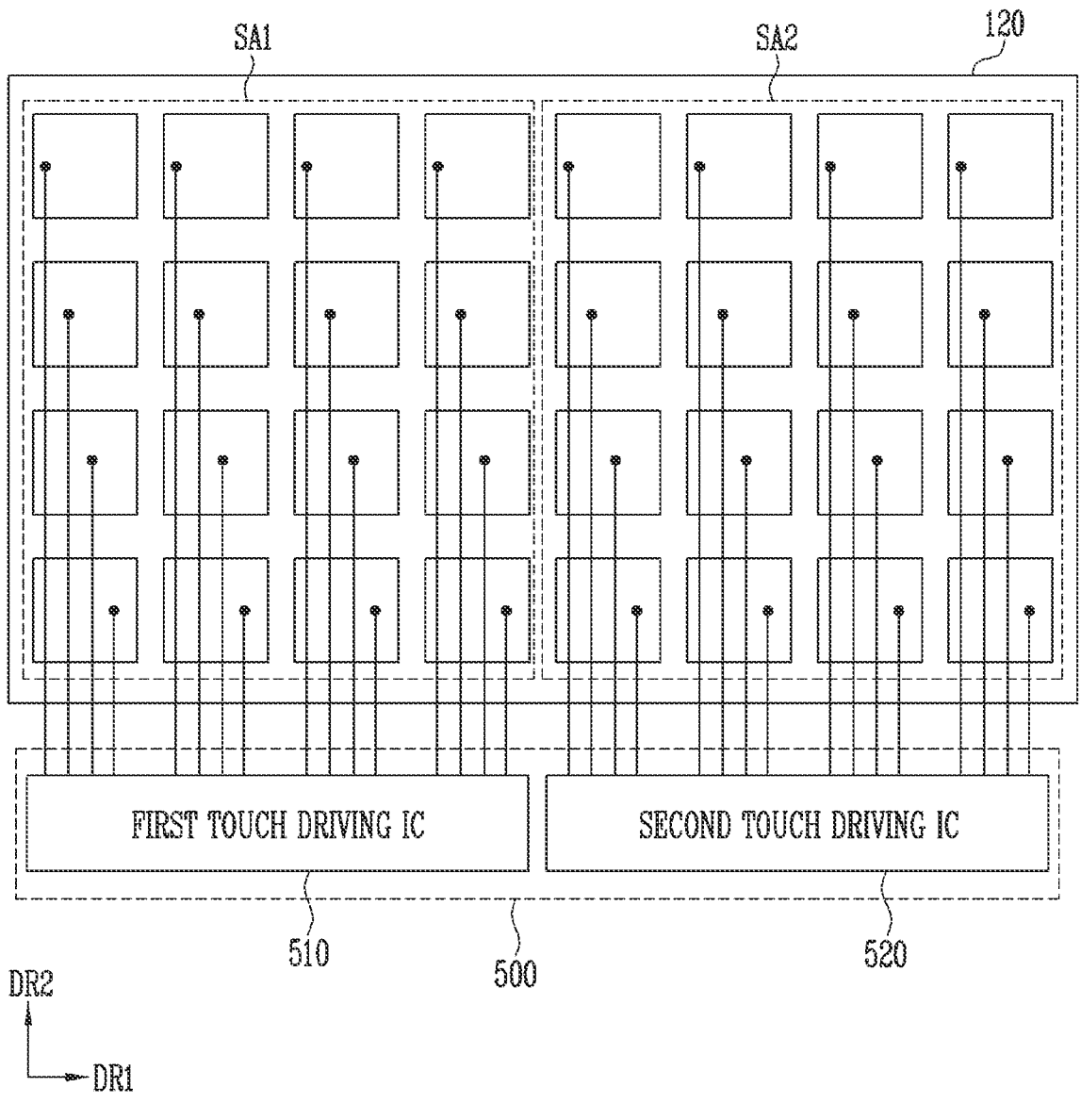
FIG. 5A and FIG. 5B illustrate a touch panel and a touch driver according to an embodiment.
Figure 5B:
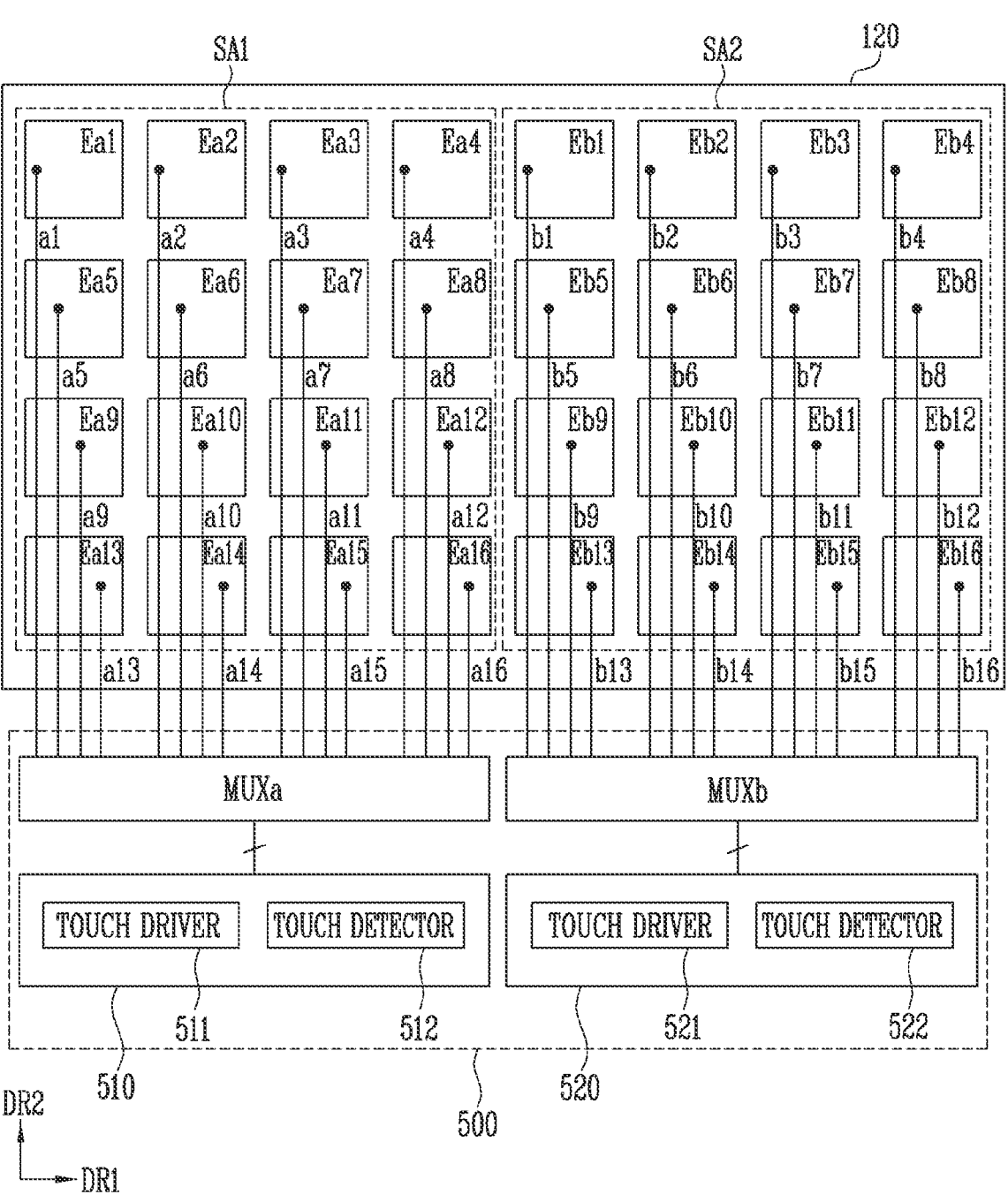

FIG. 5A and FIG. 5B are drawings for explaining a touch panel 121 and a touch driver TDR according to an embodiment.

Referring to FIG. 5A, the touch sensing portion 120 according to the embodiment may include a plurality of sensing areas SA1 and SA2. For example, the touch sensing portion 120 may include a first sensing area SA1 and a second sensing area SA2. Each of the first sensing area SA1 and the second sensing area SA2 may include a plurality of touch electrodes and a plurality of touch lines connected to the plurality of touch electrodes.

The touch electrodes included in the first sensing area SA1 and the second sensing area SA2 may be respectively connected to touch driving ICs included in a touch controller 500 through touch lines. The touch controller 500 may have the same configuration as the sensor driver 220 of FIG. 1. In the embodiment, the touch controller 500 may include a plurality of touch driving ICs. Among the plurality of touch driving ICs, a first touch driving IC 510 may be connected to touch electrodes included in the first sensing area SA1 through corresponding touch lines. Among the plurality of touch driving ICs, a second touch driving IC 520 may be connected to touch electrodes included in the second sensing area SA2 through corresponding touch lines.

As shown in FIG. 5B, in one embodiment, the touch controller 500 may include a first multiplexer MUXa and a second multiplexer MUXb. The first multiplexer MUXa and the second multiplexer MUXb are shown as separate components from the first touch driving IC 510 and the second touch driving IC 520, but in one embodiment the first multiplexer MUXa and the second multiplexer MUXb may be components in the first touch driving IC 510 and the second touch driving IC 520, respectively.

In the embodiment, touch electrodes corresponding to one touch electrode column may be connected to one channel through the multiplexers MUXa and MUXb. For example, touch electrodes Ea1, Ea5, Ea9, and Ea13 corresponding to a first electrode column, touch electrodes Ea2, Ea6, Ea10, and Ea14 corresponding to a second electrode column, touch electrodes Ea3, Ea7, Ea11, and Ea15 corresponding to a third electrode column, and touch electrodes Ea4, Ea8, Ea12, and Ea16 corresponding to a fourth electrode column may be connected to the first multiplexer MUXa through a respective one of a plurality of channels that are different from each other. Additionally, touch electrodes Eb1, Eb5, Eb9, and Eb13 corresponding to a fifth electrode column, touch electrodes Eb2, Eb6, Eb10, and Eb14 corresponding to a sixth electrode column, touch electrodes Eb3, Eb7, Eb11, and Eb15 corresponding to a seventh electrode column, and touch electrodes Eb4, Eb8, Eb12, and Eb16 corresponding to an eighth electrode column may be connected to the second multiplexer MUXb through respective ones of a plurality of channels that are different from each other. However, the number of touch electrode columns, in which touch electrodes connected to one channel, are included is not limited to the embodiment. For example, touch electrodes corresponding to two or more touch electrode columns may be connected to one channel. For example, in one embodiment, the touch electrodes Ea1, Ea5, Ea9, and Ea13 corresponding to the first electrode column and the touch electrodes Ea2, Ea6, Ea10, and Ea14 corresponding to the second electrode column may be connected to the first multiplexer MUXa through one (a same) channel.

In one embodiment, the touch electrodes included in the first sensing area SA1 may be driven by the first touch driving IC 510, and the touch electrodes included in the second sensing area SA2 may be driven by the second touch driving IC 520.

Referring again to FIG. 5B, the first touch driving IC 510 may include a touch driver 511 and a touch detector 512. The touch driver 511 may generate a precharge voltage to provide it to a touch electrode that is a sensing target, and may generate a first driving signal to provide it to an adjacent touch electrode adjacent to the touch electrode that is the sensing target. The adjacent touch electrode may be a touch electrode adjacent to a touch electrode that is a sensing target among touch electrodes connected to the same channel. For example, when the touch electrodes Ea1, Ea5, Ea9, and Ea13 corresponding to the first electrode column are connected to one channel and when the a1-th touch electrode Ea1 is a touch electrode that is a sensing target, the a5-th touch electrode Ea5 may be an adjacent touch electrode. For example, when the touch electrodes Ea1, Ea5, Ea9, and Ea13 corresponding to the first electrode column are connected to one channel and when the a5-th touch electrode Ea5 is a touch electrode that is a sensing target, the a1-th touch electrode Ea1 and the a9-th touch electrode Ea9 may be adjacent touch electrodes. For example, when the touch electrodes Ea1, Ea5, Ea9, and Ea13 corresponding to the first electrode column are connected to one channel and when the a9-th touch electrode Ea9 is a touch electrode that is a sensing target, the a5-th touch electrode Ea5 and the a13-th touch electrode Ea13 may be adjacent touch electrodes. For example, when the touch electrodes Ea1, Ea5, Ea9, and Ea13 corresponding to the first electrode column are connected to one channel and when the a13-th touch electrode Ea13 is a touch electrode that is a sensing target, the a9-th touch electrode Ea9 may be an adjacent touch electrode. The pre-charge voltage may be the same voltage as, for example, the pre-charge voltage Vpre described with reference to FIG. 4. The first driving signal may be the same signal as the driving signal Vdrv described with reference to FIG. 4. In one embodiment, the first driving signal may be a signal of a pulse waveform having a predetermined voltage level and frequency.

The touch detector 512 may detect a touch after the pre-charge voltage is applied to a touch electrode that is a sensing target and the first driving signal is applied to an adjacent touch electrode.

In the embodiment, touch driving for the electrodes Ea1 to Ea16 included in the first sensing area SA1 may be performed in a predetermined manner (e.g., sequentially performed) for each touch electrode unit during one frame period. The sequence may vary among different embodiments. For example, touch driving may be sequentially performed from the a1-th touch electrode Ea1 to the a16-th touch electrode Ea16. In one embodiment, touch driving for each touch electrode may be performed a plurality of times during one frame period. The number of times touch driving is performed for each touch electrode during one frame period may be predetermined. For example, when the predetermined number of times is three, touch driving may be performed on the a1-th touch electrode Ea1 three times, and then touch driving may be performed on the a2-th touch electrode Ea2. After the touch driving is performed on the a2-th touch electrode Ea2 three times, the touch driving on the a3-th touch electrode Ea3 may be performed. In this way, touch driving may be sequentially performed a predetermined number of times from the a1-th touch electrode Ea1 to the a16-th touch electrode Ea16 during one frame period. The predetermined number of times described above may be different in other embodiments, e.g., the predetermined number may be one or any number greater than one.

In one embodiment, touch driving for the electrodes Ea1 to Ea16 included in the first sensing area SA1 may be sequentially performed in units of touch electrode rows during one frame period. For example, the pre-charge voltage may be simultaneously supplied to touch electrodes that are a plurality of sensing targets connected to one touch electrode row, for example, the a1-th touch electrode Ea1, the a2-th touch electrode Ea2, the a3-th touch electrode Ea3, and the a4-th touch electrode Ea4. In this case, the first driving signal may be simultaneously supplied to the a5-th touch electrode Ea5, the a6-th touch electrode Ea6, the a7-th touch electrode Ea7, and the a8-th touch electrode Ea8 that are adjacent touch electrodes. After the pre-charge voltage and the first driving signal are respectively supplied to the touch electrodes that are sensing targets and the adjacent touch electrodes, touch detection may be performed on the touch electrodes that are sensing targets.

Referring again to FIG. 5B, the second touch driving IC 520 may include a touch driver 521 and a touch detector 522. The touch driver 521 may generate a precharge voltage and provide it to a touch electrode that is a sensing target, and may generate a second driving signal and provide it to an adjacent touch electrode that is adjacent to the touch electrode that is the sensing target. The pre-charge voltage may be, for example, the same voltage as the pre-charge voltage Vpre described with reference to FIG. 4. The second driving signal may be, for example, the same signal as the driving signal Vdrv described with reference to FIG. 4. The second driving signal may be a signal of a pulse waveform having a predetermined voltage level and frequency.

The touch detector 522 may detect a touch after the pre-charge voltage is applied to a touch electrode that is a sensing target and the second driving signal is applied to an adjacent touch electrode.

In one embodiment, touch driving for the electrodes Eb1 to Eb16 included in the second sensing area SA2 may be performed in a predetermined manner (e.g., sequentially performed) for each touch electrode unit during one frame period. The sequence may vary among embodiments. In one case, touch driving may be sequentially performed in order from the b1-th touch electrode Eb1 to the b16-th touch electrode Eb16. In one embodiment, touch driving for each touch electrode may be performed a plurality of times during one frame period. The number of times touch driving is performed for each touch electrode during one frame period may be predetermined. For example, when the predetermined number of times is three, touch driving may be performed on the b1-th touch electrode Eb1 three times, and then touch driving may be performed on the b2-th touch electrode Eb2. After the touch driving is performed on the b2-th touch electrode Eb2 three times, the touch driving on the b3-th touch electrode Eb3 may be performed. In this way, touch driving may be sequentially performed a predetermined number of times from the b1-th touch electrode Eb1 to the b16-th touch electrode Eb16 during one frame period. The predetermined number of times described above is three, but may be a different number in other embodiments, e.g., one or any number greater than one.

In one embodiment, touch driving for the electrodes Eb1 to Eb16 included in the second sensing area SA2 may be sequentially performed in units of touch electrode rows during one frame period. For example, the pre-charge voltage may be simultaneously supplied to touch electrodes that are a plurality of sensing targets connected to one touch electrode row, for example, the b1-th touch electrode Eb1, the b2-th touch electrode Eb2, the b3-th touch electrode Eb3, and the b4-th touch electrode Eb4. In this case, the second driving signal may be simultaneously supplied to the b5-th touch electrode Eb5, the b6-th touch electrode Eb6, the b7-th touch electrode Eb7, and the b8-th touch electrode Eb8 that are adjacent touch electrodes. After the pre-charge voltage and the second driving signal are respectively supplied to the touch electrodes that are sensing targets and the adjacent touch electrodes, touch detection may be performed on the touch electrodes that are sensing targets.

In one embodiment, the touch driving for the touch electrodes Ea1 to Ea16 included in the first sensing area SA1 and the touch driving for the touch electrodes Eb1 to Eb16 included in the second sensing area SA2 may be independently performed by the first touch driving IC 510 and the second touch driving IC 520, respectively.

In one embodiment, the first driving signal provided by touch driver 511 (in the first touch driving IC 510) to the touch electrodes Ea1 to Ea16 included in the first sensing area SA1 may have a first frequency. The second driving signal provided by the touch driver 521 (in the second touch driving IC 520) to the touch electrodes Eb1 to Eb16 included in the second sensing area SA2 may have a second frequency. The first and second frequencies may be different frequencies. Accordingly, electromagnetic interference (EMI) that may otherwise occur between the touch electrodes Ea1 to Ea16 included in the first sensing area SA1 and the touch electrodes Eb1 to Eb16 included in the second sensing area SA2 may be reduced during a touch operation.

Figure 6A:
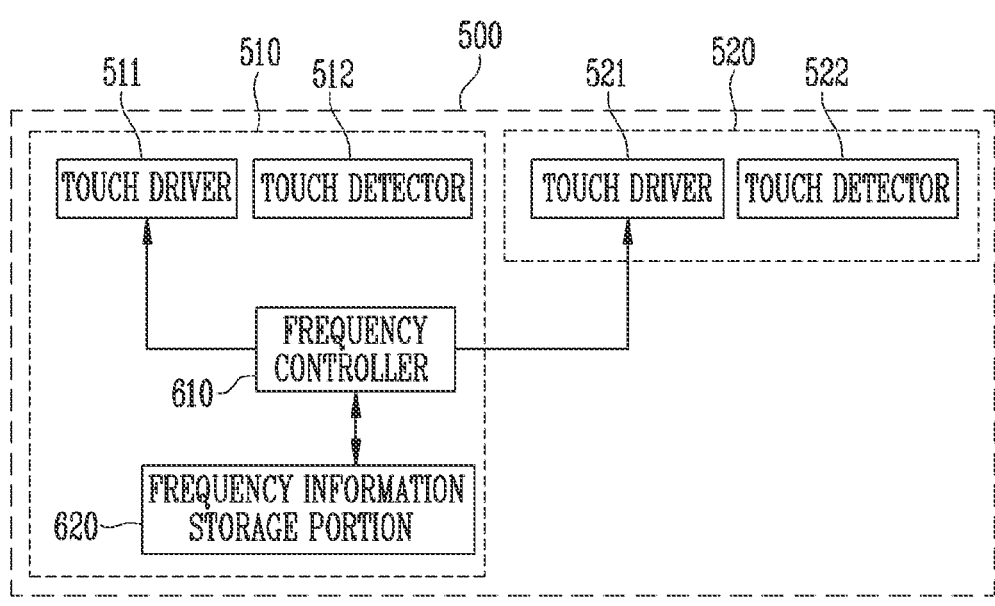
FIG. 6A and FIG. 6B illustrate an operation in which a frequency of a driving signal is changed according to an embodiment.
Figure 6B:
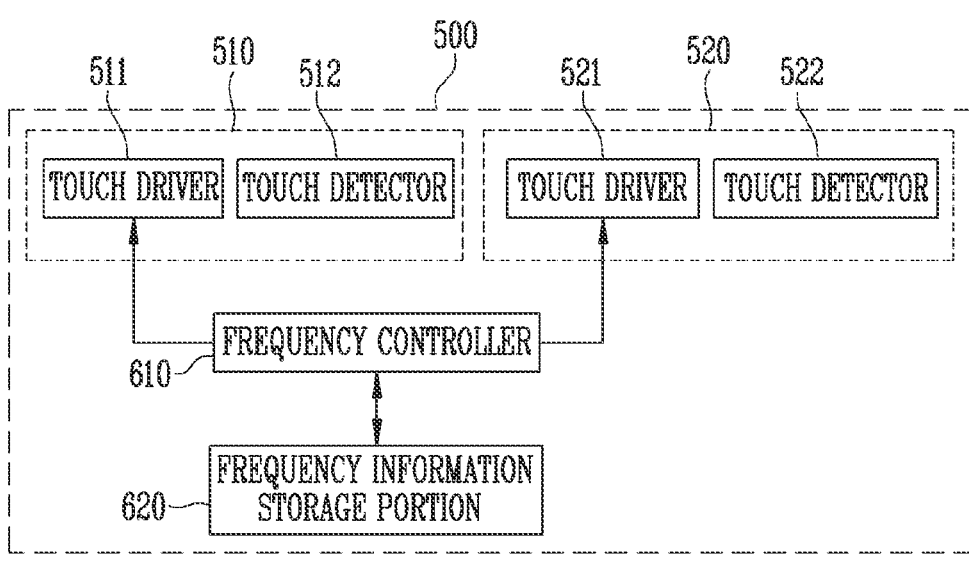

FIG. 6A and FIG. 6B are drawings for explaining embodiments for changing a frequency of a driving signal as discussed above. In one embodiment, the frequency of the first driving signal provided from the first touch driving IC 510 to the touch electrodes included in the first sensing area and the frequency of the second driving signal provided from the second touch driving IC 520 to the touch electrodes included in the second sensing area may change at predetermined time intervals.

Referring to FIG. 6A, the first touch driving IC 510 may include a frequency controller 610 and a frequency information storage portion 620. In the embodiment, an operation in which the frequency of the first driving signal and the frequency of the second driving signal are changed may be controlled by the frequency controller 610 included in the first touch driving IC 510.

For example, the frequency controller 610 may provide a first frequency change signal to the touch driver 511 at one or more predetermined times. The first frequency change signal may include a clock signal and information about the frequency of the first driving signal to be changed. The touch driver 511 may change the frequency of the first driving signal at a predetermined time based on the first frequency change signal, and may provide the first driving signal having the changed frequency to the touch electrodes included in the first sensing area.

The frequency controller 610 may provide a second frequency change signal to the touch driver 521 at one or more predetermined times. The second frequency change signal may include a clock signal and information about the frequency of the second driving signal to be changed. The touch driver 521 may change the frequency of the second driving signal at a predetermined time based on the second frequency change signal, and may provide the second driving signal having the changed frequency to the touch electrodes included in the second sensing area.

In one embodiment, the frequency controller 610 and the frequency information storage portion 620 may not be components included in the first touch driving IC, but may be individual components included in the touch controller 500. For example, unlike the embodiment described with reference to FIG. 6A, an operation in which the frequency of the first driving signal and the frequency of the second driving signal are changed may be controlled by the frequency controller 610 included in the touch controller 500.

For example, referring to FIG. 6B, the frequency controller 610 may provide the first frequency change signal to the touch driver 511 of the first touch driving IC 510 at predetermined times. The frequency controller 610 may provide the second frequency change signal to the touch driver 521 of the second touch driving IC 520 at predetermined times. In FIG. 6A and FIG. 6B, an operation in which the frequency of the first driving signal is changed and an operation in which the frequency of the second driving signal is changed may be simultaneously performed or may be independently performed at different times.

FIG. 7A is a drawing for explaining the frequency information storage portion 620 according to an embodiment.

Referring to FIG. 6A, FIG. 6B, and FIG. 7A, the first touch driving IC 510 or the touch controller 500 may further include the frequency information storage portion 620. The frequency information storage portion 620 may include one or more frequency sets (e.g., frequency set 1 to frequency set 5). Each of the plurality of frequency sets (frequency set 1 to frequency set 5) may include first frequency information and second frequency information that are different from each other. The first frequency information may be information indicating the frequency of the first driving signal, and the second frequency information may be information indicting the frequency of the second driving signal.

In the embodiment, the frequency corresponding to the first frequency information included in each frequency set may be different from the frequency corresponding to the second frequency information. For example, frequency set 1 may include information indicating a first frequency frq1 corresponding to the first frequency information and a second frequency frq2 corresponding to the second frequency information. The first frequency frq1 and the second frequency frq2 may be different from each other.

The frequency set 2 may include information indicating a third frequency frq3 corresponding to the first frequency information and a fourth frequency frq4 corresponding to the second frequency information. The third frequency frq3 and the fourth frequency frq4 may be different from each other.

The frequency set 3 may include information indicating a fifth frequency frq5 corresponding to the first frequency information and a sixth frequency frq6 corresponding to the second frequency information. The fifth frequency frq5 and the sixth frequency frq6 may be different from each other.

The frequency set 4 may include information indicating a seventh frequency frq7 corresponding to the first frequency information and an eighth frequency frq8 corresponding to the second frequency information. The seventh frequency frq7 and the eighth frequency frq8 may be different from each other.

The frequency set 5 may include information indicating a ninth frequency frq9 corresponding to the first frequency information and a tenth frequency frq8 corresponding to the second frequency information. The ninth frequency frq9 and the tenth frequency frq10 may be different from each other.

The frequency controller 610 may receive, from the frequency information storage portion 620, the first frequency information and the second frequency information included in one of the plurality of frequency sets (frequency set 1 to frequency set 5) at each predetermined point in time. The frequency controller 610 may generate the first frequency change signal according to the first frequency information received from the frequency information storage portion 620. The frequency controller 610 may generate the second frequency change signal according to the second frequency information received from the frequency information storage portion 620.

In the above embodiment, one frequency set provided to the frequency controller 610 may be selected randomly or in a predetermined order among the plurality of frequency sets (frequency set 1 to frequency set 5).

In one embodiment, the first frequency frq1 and the second frequency frq2 may be alternately selected as the frequency of the first driving signal and the frequency of the second driving signal. For example, when the frequency of the first driving signal is selected as the first frequency frq1 and the frequency of the second driving signal is selected as the second frequency frq2, then at a predetermined time point frequencies may be exchanged, that is, the frequency of the first driving signal may be changed to the second frequency frq2 and the frequency of the second driving signal may be changed to the first frequency frq1. Although five frequency sets are shown in the example of FIG. 7A, a different number of frequency sets may be used in other embodiments, e.g., one or more frequency sets may be used.

In the embodiment, the values of the plurality of frequencies stored in the frequency information storage portion 620 may increase or decrease at regular intervals. For example, in FIG. 7A, the values of the frequencies may increase or decrease at regular intervals from the first frequency frq1 to the tenth frequency frq10.

In one embodiment, intervals between frequencies indicated by the first frequency information included in each of the plurality of frequency sets may be the same, and intervals between frequencies indicated by the second frequency information included in each of the plurality of frequency sets may be the same. In this case, the intervals between the frequencies indicated by the first frequency information and the intervals between the frequencies indicated by the second frequency information may be different from each other. For example, in FIG. 7A, the intervals between the first, third, fifth, seventh, and ninth frequencies frq1, frq3, frq5, frq7, and frq9 and the intervals between the second, fourth, sixth, eighth, and tenth frequencies frq2, frq4, frq6, frq8, and frq10 may be different from each other.

FIG. 7B is a drawing for explaining the frequency information storage portion 620 according to another embodiment.

Referring to FIG. 6A, FIG. 6B, and FIG. 7B, the frequency information storage portion 620 may include information indicating a plurality of frequency change ranges. The frequency controller 610 receives one of the information on the plurality of frequency change ranges from the frequency information storage portion 620 according to selection from the an external component, and then may respectively control the touch drivers 511 and 521 to change the frequencies of the first driving signal and the second driving signal at predetermined times.

For example, when a first set value (set 1) is selected, the frequencies of the first driving signal and the second driving signal may be controlled to gradually increase or decrease at intervals of 0.01 kHz in the range of 0.01 kHz to 0.1 kHz. In one embodiment, the frequencies of the first driving signal and the second driving signal may be randomly selected in the range of 0.01 kHz to 0.1 kHz. However, in this case, the frequency of the first driving signal and the frequency of the second driving signal may be controlled to be different from each other.

For example, when a second set value (set 2) is selected, the frequencies of the first driving signal and the second driving signal may be controlled to gradually increase or decrease at intervals of 0.1 kHz in the range of 0.1 kHz to 1 kHz. Alternatively, the frequencies of the first driving signal and the second driving signal may be randomly selected in the range of 0.1 kHz to 1 kHz. However, in this case, the frequency of the first driving signal and the frequency of the second driving signal may be controlled to be different from each other.

For example, when a third set value (set 3) is selected, the frequencies of the first driving signal and the second driving signal may be controlled to gradually increase or decrease at intervals of 1 kHz in the range of 1 kHz to 10 kHz. Alternatively, the frequencies of the first driving signal and the second driving signal may be randomly selected in the range of 1 kHz to 10 kHz. However, in this case, the frequency of the first driving signal and the frequency of the second driving signal may be controlled to be different from each other.

When a fourth set value (set 4) is selected, the frequencies of the first driving signal and the second driving signal may gradually increase or decrease at intervals of 10 kHz in the range of 10 kHz to 100 kHz. Alternatively, the frequencies of the first driving signal and the second driving signal may be randomly selected in the range of 10 kHz to 100 kHz. However, in this case, the frequency of the first driving signal and the frequency of the second driving signal may be controlled to be different from each other.

In one embodiment, referring to FIG. 7B, the frequency of the first driving signal and the frequency of the second driving signal may be controlled to be changed in different frequency change ranges. For example, the frequency of the first driving signal may be controlled to be changed within a range of 0.01 kHz to 0.1 kHz, and the frequency of the second driving signal may be controlled to be changed within a range of 1 kHz to 10 kHz. For example, the frequency of the first driving signal may be controlled to be changed within a range of 0.1 kHz to 1 kHz, and the frequency of the second driving signal may be controlled to be changed within a range of 10 kHz to 100 kHz. In this case, the frequency of the first driving signal and the frequency of the second driving signal may be controlled to be different from each other.

Figure 8A:
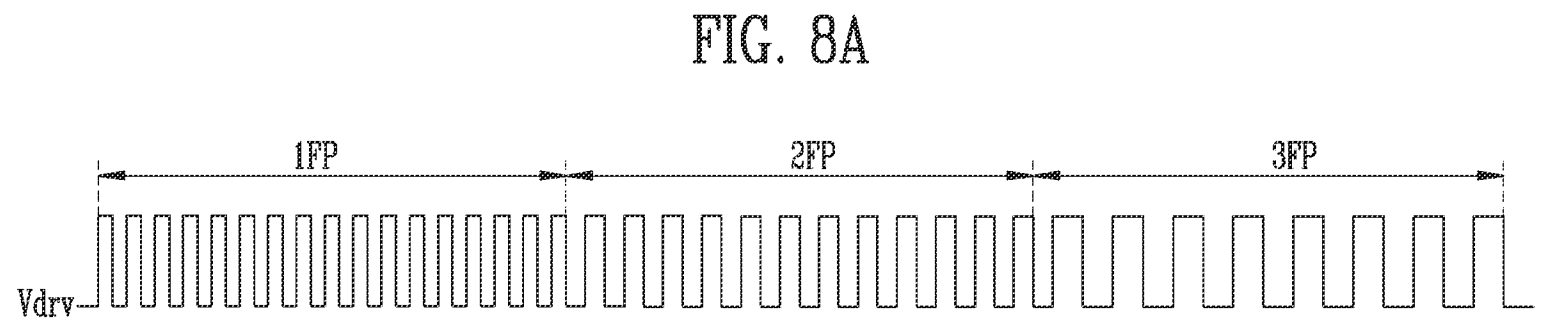
Figure 8B:
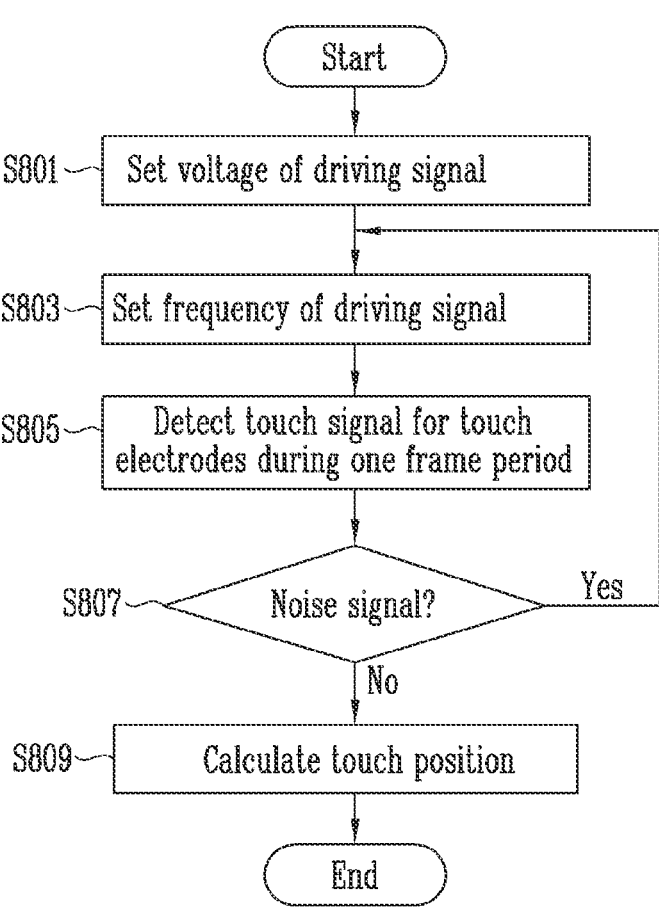

FIG. 8A and FIG. 8B are drawings for explaining an embodiment in which the frequency of a driving signal is changed for each frame period.

Referring to FIG. 8A, as described with reference to FIG. 4, during touch driving, the driving signal Vdrv may be provided for the touch electrodes from the touch driver. For example, the first driving signal may be provided for the touch electrodes included in the first sensing area from the first touch driving IC, and the second driving signal may be provided for the touch electrodes included in the second sensing area SA2 from the second touch driving IC. The first driving signal and the second driving signal may have different frequencies.

Referring to FIG. 5B, FIG. 8A, and FIG. 8B, in operation S801, voltages of the first driving signal and the second driving signal may be set.

In operation S803, the frequencies of the first driving signal and the second driving signal may be set. In this case, for example, one of a plurality of frequency sets illustrated in FIG. 7A may be selected, or one of a plurality of setting values (set1 to set4) illustrated in FIG. 7B may be selected. The frequency of the first driving signal and the frequency of the second driving signal may be different from each other.

In operation S805, touch signals for the touch electrodes Ea1 to Ea16 included in the first sensing area and for touch electrodes Eb1 to Eb16 included in the second sensing area may be detected during a first frame period 1FP.

In operation S807, it may be determined whether the detected touch signal is a noise signal. For example, among the touch electrodes Ea1 to Ea16 included in the first sensing area and the touch electrodes Eb1 to Eb16 included in the second sensing area, when a touch electrode having a change in capacitance value (or voltage level of the sensing node) between respective touch electrodes and the common electrode exists, it may be determined whether the detected touch signal is a noise signal.

When it is determined that the detected touch signal is not a noise signal, the touch position may be calculated by calculating the position of the touch electrode where the capacitance value (or the voltage level of the sensing node) changes (S809). Thereafter, a next frame period may proceed. In this case, the frequency of the driving signal may be set again.

When it is determined that the detected touch signal is a noise signal, operation S809 may be omitted and the next frame period may proceed. In this case, the frequency of the driving signal may be set again.

For example, after the first frame period 1FP ends, the frequency of the first driving signal and the frequency of the second driving signal change, and in a second frame period 2FP, touch driving may be performed based on the changed first and second driving signals. After the second frame period 2FP ends, the frequency of the first driving signal and the frequency of the second driving signal change again, and in a third frame period 3FP, touch driving may be performed by the changed first and second driving signals.

Figure 9A:
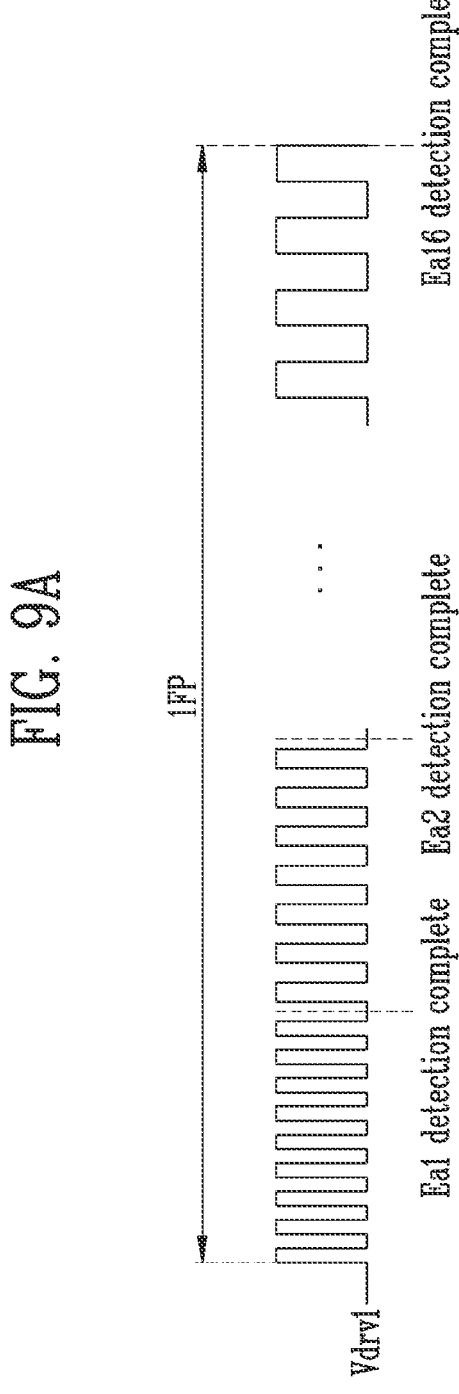
FIG. 9A and FIG. 9B illustrate a case in which a frequency of a driving signal is changed whenever a touch signal for one touch electrode is detected according to an embodiment.
Figure 9B:
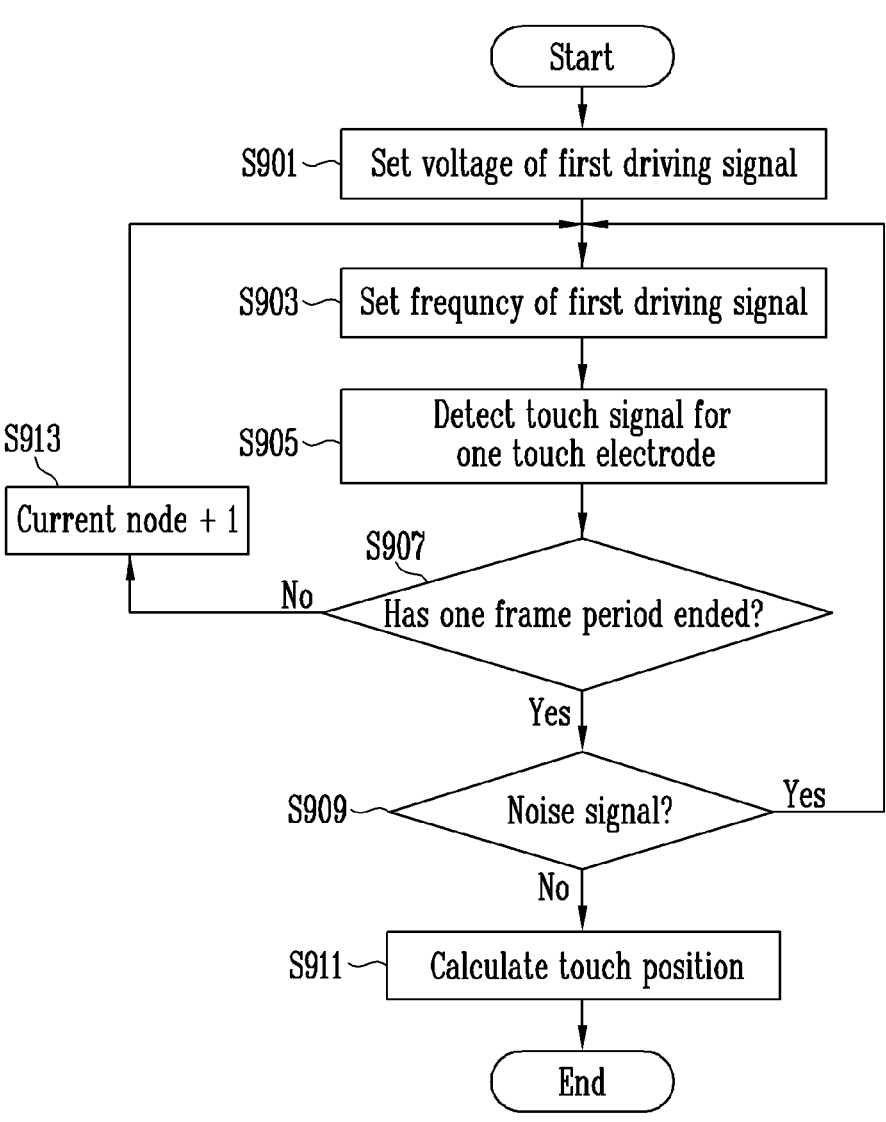

FIG. 9A and FIG. 9B are diagrams for explaining an embodiment in which the frequency of a driving signal is changed whenever a touch signal for one touch electrode is detected. In this embodiment, the frequency of the first driving signal and the frequency of the second driving signal may be changed every time the detection of the touch signal for one touch electrode is completed.

For example, in operation S901, the voltage of the first driving signal may be set.

In operation S903, the frequency of the first driving signal may be set. In this case, the frequency of the first driving signal may be set to be different from the frequency of the second driving signal.

In operation S905, a touch signal for one touch electrode may be detected. For example, a touch signal for the a1-th touch electrode Ea1 may be detected.

In operation S907, it may be determined whether one frame period has ended. When one frame period has not ended, a touch signal for a touch electrode of the next order may be detected (operation S913). In this case, the frequency of the first driving signal may be set again. For example, after the touch signal for the a1-th touch electrode Ea1 is detected, the frequency of the first driving signal may be changed. Thereafter, touch detection for the a2-th touch electrode Ea2 may be performed by the first driving signal having the changed frequency. The frequency of the first driving signal set again may be different from the frequency of the second driving signal.

When one frame period ends (for example, when touch detection for the a16-th touch electrode Ea16 ends), it may be determined whether the detected touch signal is a noise signal (operation S909). For example, among the touch electrodes Ea1 to Ea16 included in the first sensing area SA1, when a touch electrode having a change in the capacitance value (or voltage level of the sensing node) formed between respective touch electrodes and the common electrode exists, it may be determined whether the detected touch signal is a noise signal.

When it is determined that the detected touch signal is not a noise signal, the touch position may be calculated by calculating the position of the touch electrode where the capacitance value changes (S911). Thereafter, a next frame period may proceed. In this case, the frequency of the first driving signal may be set again. The frequency of the first driving signal set again may be different from the frequency of the second driving signal.

When it is determined that the detected touch signal is a noise signal, operation S911 may be omitted and the next frame period may proceed. In this case, the frequency of the first driving signal may be set again. The frequency of the first driving signal set again may be different from the frequency of the second driving signal.

FIG. 9A and FIG. 9B are described based on the touch electrodes included in the first sensing area and the first driving signal. The operation of changing the frequency of the driving signal every time the detection of the touch signal for one touch electrode is completed may be the same for the touch electrodes included in the second sensing area and the second driving signal. Therefore, redundant descriptions are omitted.

Figure 10A:
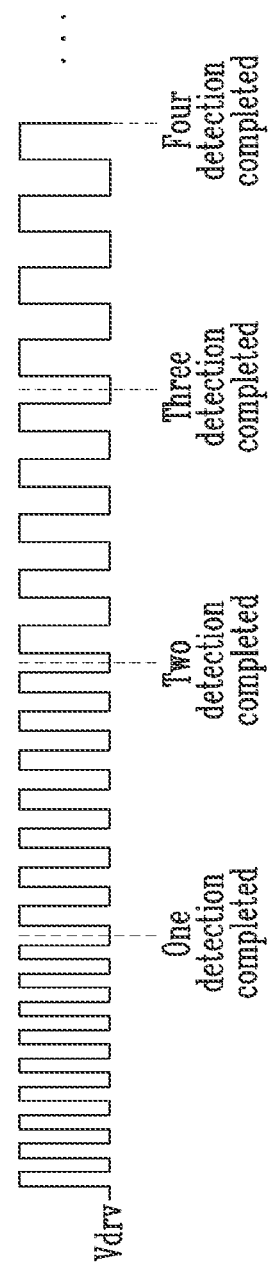
FIG. 10A and FIG. 10B illustrate a case in which a touch signal detection operation is performed multiple times for the same touch electrode according to an embodiment.
Figure 10B:
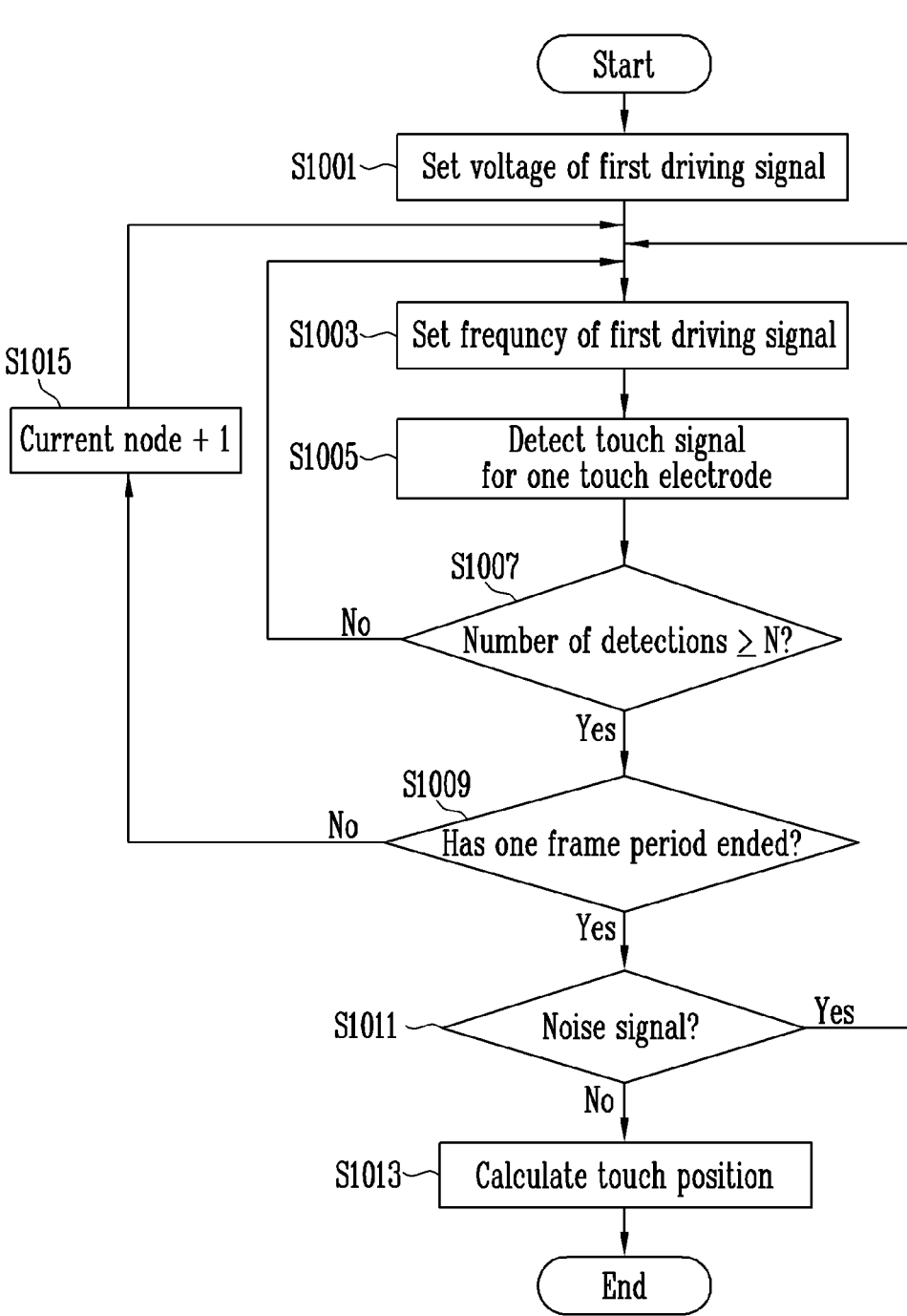

FIG. 10A and FIG. 10B are drawings for explaining an embodiment in which a touch signal detection operation is performed multiple times for the same touch electrode. In this embodiment, the touch signal detection operation may be performed a plurality of times for each of the touch electrodes. In this case, whenever touch signal detection is completed once, the frequency of the driving signal Vdrv may be changed.

Referring to FIG. 10A and FIG. 10B, in operation S1001, the voltage of the first driving signal may be set.

In operation S1003, the frequency of the first driving signal may be set. In this case, the frequency of the first driving signal may be set to be different from the frequency of the second driving signal.

In operation S1005, a touch signal for one touch electrode may be detected. For example, a touch signal for the a1-th touch electrode Ea1 may be detected.

In operation S1007, it may be determined whether the number of times a touch signal for one touch electrode is detected is greater than or equal to a predetermined number of times N (where N is a natural number). For example, the number of times a touch signal for the a1-th touch electrode Ea1 is detected may be compared with the predetermined number of times N. As a result of the comparison, when the detected number of times is fewer than the predetermined number of times N, the touch signal for the a1-th touch electrode Ea1 may be detected again. In this case, the frequency of the first driving signal may be set again. The frequency of the first driving signal set again may be different from the frequency of the second driving signal.

As a result of the comparison, when the detected number of times is greater than or equal to the predetermined number of times N, it may be determined whether one frame period has ended (operation S1009). When one frame period has not ended, a touch signal for the next touch electrode (for example, the a2-th touch electrode Ea2) may be detected (operation S1015). In this case, the frequency of the first driving signal may be set again. The frequency of the first driving signal set again may be different from the frequency of the second driving signal.

When one frame period ends, for example, when touch detection for the a16-th touch electrode Ea16 is performed the predetermined number of times N, it may be determined whether the detected touch signal is a noise signal (operation S1011). For example, among the touch electrodes Ea1 to Ea16 included in the first sensing area, when a touch electrode having a change in capacitance value (or voltage level of the sensing node) formed between respective touch electrodes and the common electrode exists, it may be determined whether the detected touch signal is a noise signal.

When it is determined that the detected touch signal is not a noise signal, the touch position may be calculated by calculating the position of the touch electrode where the capacitance value changes (S1013). Thereafter, a next frame period may proceed. In this case, the frequency of the first driving signal may be set again. The frequency of the first driving signal set again may be different from the frequency of the second driving signal.

When it is determined that the detected touch signal is a noise signal, operation S1013 may be omitted and the next frame period may proceed. In this case, the frequency of the first driving signal may be set again. The frequency of the first driving signal set again may be different from the frequency of the second driving signal.

FIG. 10A and FIG. 10B are described based on the touch electrodes included in the first sensing area and the first driving signal. The operation of changing the frequency of the second driving signal every time the touch signal detection operation is performed may be the same for the touch electrodes included in the second sensing area and the second driving signal, where the touch signal detection operation is performed a plurality of times for the same touch electrode. Therefore, redundant descriptions are omitted.

Regarding the configuration and driving method of the touch sensing portion, in FIG. 1 to FIG. 10B, the self-capacitance type touch sensor has been mainly described, but the touch driving method according to the embodiment is not limited to the self-capacitance type touch sensor. For example, the touch sensor and touch driving method according to the present disclosure may also be applied to a mutual-type touch sensor.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, devices, modules, units, multiplexers, generators, interfaces, detectors, portions, drivers, generators and other signal generating and signal processing features of the embodiments disclosed herein may be implemented, for example, in non-transitory logic that may include hardware, software, or both. When implemented at least partially in hardware, the controllers, processors, devices, modules, units, multiplexers, generators, interfaces, detectors, portions, drivers, generators and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

The technical idea of the present disclosure has been specifically described according to the preferred embodiments, but it should be noted that the foregoing embodiments are provided only for illustration while not limiting the present disclosure. In addition, it will be understood by those skilled in the art that various changes in form and details may be made therein without departing from the scope of the present disclosure.

The technical scope of the present disclosure may be determined by on the technical scope of the accompanying claims. In addition, all changes or modifications that come within the meaning and range of the claims and their equivalents will be interpreted as including the range of the present disclosure. The embodiments may be combined to form additional embodiments.

What is claimed is:

1. An electronic device comprising:
a touch panel including touch electrodes; and
a touch controller configured to provide a driving signal to the touch electrodes and detect a touch and a touch position by sensing a change in values of capacitance formed between the touch electrodes and a common electrode,
wherein:
the touch controller includes a first touch driving integrated circuit (IC) corresponding to first touch electrodes included in a first sensing area among the touch electrodes and a second touch driving IC corresponding to second touch electrodes included in a second sensing area among the touch electrodes, and
a first driving signal provided to the first touch electrodes from the first touch driving IC and a second driving signal provided to the second touch electrodes from the second touch driving IC have different frequencies that are changed in sets during a driving period by different non-zero frequency intervals, respectively,
wherein frequency changes of the first driving signals and the second driving signals are independently performed at different times, and
the frequency of the first driving signal and the frequency of the second driving signal are changed in different frequency change ranges.

2. The electronic device of claim 1,
wherein a frequency of the first driving signal and a frequency of the second driving signal are changed at predetermined time points,
wherein the first touch driving IC includes a first touch driver and a first touch detector connected to a first multiplexer, and the second touch driving IC includes a second touch driver and a second touch detector connected to a second multiplexer.

3. The electronic device of claim 1, wherein:
the value of the capacitance corresponding to each of the touch electrodes is detected for each frame period, and
the frequency of the first driving signal and the frequency of the second driving signal are changed every time one frame period ends.

4. The electronic device of claim 1, wherein:
the frequency of the first driving signal is changed whenever touch detection is completed for one of the first touch electrodes, and the frequency of the second driving signal is changed whenever touch detection is completed for one of the second touch electrodes.

5. The electronic device of claim 4, wherein:
the touch detection for one of the first touch electrodes and the touch detection for one of the second touch electrodes are performed a predetermined number of times for each touch electrode, and
the frequency of the first driving signal and the frequency of the second driving signal are respectively changed each time the touch detection for each touch electrode is completed once.

6. The electronic device of claim 1, wherein each of the first touch driving IC and the second touch driving IC includes:
a touch driver configured to generate one of the first driving signal and the second driving signal and to provide the first driving signal or the second driving signal to the touch electrodes, and
a touch detector configured to detect the values of the capacitance.

7. The electronic device of claim 6, wherein:
the touch controller includes a frequency controller configured to control the frequencies of the first driving signal and the second driving signal, and
the frequency controller is configured to:
provide a first frequency change signal to the touch driver of the first touch driving IC at each predetermined time point, to control the touch driver of the first touch driving IC to change the frequency of the first driving signal, and
provide a second frequency change signal to the touch driver of the second touch driving IC at each predetermined time point, to control the touch driver of the second touch driving IC to change the frequency of the second driving signal.

8. The electronic device of claim 6, wherein:
the first touch driving IC includes a frequency controller configured to provide a first frequency change signal to the touch driver of the first touch driving IC at each predetermined time point, to control the touch driver of the first touch driving IC to change the frequency of the first driving signal, and
the frequency controller is configured to provide a second frequency change signal to the touch driver of the second touch driving IC at each predetermined time point, to control the touch driver of the second touch driving IC to change the frequency of the second driving signal.

9. The electronic device of claim 8, wherein:
the first touch driving IC includes a frequency information storage portion including a plurality of frequency sets, wherein each of the plurality of frequency sets includes first frequency information and second frequency information that are different from each other, and
the frequency controller is configured to receive first frequency information and second frequency information included in one of the plurality of frequency sets at each predetermined time point, and to generate the first frequency change signal according to the first frequency information and generate the second frequency change signal according to the second frequency information.

10. The electronic device of claim 9, wherein the one of the plurality of frequency sets provided to the frequency controller is selected randomly or in a predetermined order from among the plurality of frequency sets.

11. The electronic device of claim 9, wherein:

intervals between frequencies indicated by the first frequency information included in each of the plurality of frequency sets are same, intervals between frequencies indicated by the second frequency information included in each of the plurality of frequency sets are same, the intervals between the frequencies indicated by the first frequency information and the intervals between the frequencies indicated by the second frequency information are different from each other.

12. A touch driving method comprising:

providing driving signals to touch electrodes included in a touch panel; and detecting a touch and a touch position by sensing a change in values of capacitance formed between the touch electrodes and a common electrode, wherein the providing the driving signals includes:

providing a first driving signal to first touch electrodes included in a first sensing area among the touch electrodes, and providing a second driving signal to second touch electrodes included in a second sensing area among the touch electrodes, wherein the first driving signal and the second driving signal have different frequencies that are changed in sets during a driving period by different non-zero frequency intervals, respectively, scheduling the frequency changes of the first driving signal and the second driving signal to be independently performed at different times; and controlling the frequency of the first driving signal and the frequency of the second driving signal in different frequency change ranges.

13. The touch driving method of claim 12, wherein detecting the touch and the touch position includes:

detecting the values of the capacitance corresponding to each of the first touch electrodes after the first driving signal is provided to the first touch electrodes, and detecting the values of the capacitance corresponding to each of the second touch electrodes after the second driving signal is provided to the second touch electrodes.

14. The touch driving method of claim 12, further comprising:

changing a frequency of the first driving signal and a frequency of the second driving signal at each predetermined time point.

15. The touch driving method of claim 14, wherein:

providing the driving signal to the touch electrodes and detecting the touch and the touch position are performed for each frame period, and changing the frequency of the first driving signal and the frequency of the second driving signal at each predetermined time point includes changing the frequencies of the first driving signal and the second driving signal every time one frame period ends.

16. The touch driving method of claim 14, wherein changing the frequency of the first driving signal and the frequency of the second driving signal at each predetermined time point includes:

changing the frequency of the first driving signal whenever touch detection of one of the first touch electrodes is completed, and changing the frequency of the second driving signal whenever touch detection of one of the second touch electrodes is completed.

17. The touch driving method of claim 14, wherein changing the frequency of the first driving signal and the frequency of the second driving signal at each predetermined time point includes:

providing a first frequency change signal to control a first touch driver to change the frequency of the first driving signal at each predetermined time point, with respect to the first touch driver that provides the first driving signal to the first touch electrodes, and providing a second frequency change signal to control a second touch driver to change the frequency of the second driving signal at each predetermined time point, with respect to the second touch driver that provides the second driving signal to the second touch electrodes.

18. The touch driving method of claim 17, wherein:

touch driving of the first touch electrodes is controlled by a first touch driving IC and touch driving of the second touch electrodes is controlled by a second touch driving IC, and providing the first frequency change signal to the first touch driver and providing the second frequency change signal to the second touch driver are controlled by a frequency controller included in the first touch driving IC.

19. The touch driving method of claim 18, wherein:

the first touch driving IC includes a frequency information storage portion including a plurality of frequency sets, each of the plurality of frequency sets includes first frequency information and second frequency information that are different from each other, and changing the frequency of the first driving signal and the frequency of the second driving signal at each predetermined time point includes:

receiving first frequency information and second frequency information included in one of the plurality of frequency sets at each predetermined time point, generating the first frequency change signal according to the first frequency information included in the one frequency set, and generating the second frequency change signal according to the second frequency information included in the one frequency set.

20. The touch driving method of claim 19, wherein receiving the first frequency information and the second frequency information included in the one frequency set includes selecting the one frequency set randomly or in a predetermined order from among the plurality of frequency sets.

21. A touch controller, comprising:

a first touch driver configured to drive touch electrodes in a first sensing area of a touch panel; and a second touch driver configured to drive touch electrodes in a second sensing area of the touch panel, wherein the first touch driver is configured to drive the touch electrodes in the first sensing area based on a first driving signal and the second touch driver is configured to drive the touch electrodes in the second sensing area based on a second driving signal, the first driving signal and the second driving signal having different frequencies that are changed in sets during a driving period by different non-zero frequency intervals, respectively, wherein the first driving signal and the second driving signal have different frequencies that are changed in sets during a driving period by different non-zero frequency intervals, respectively, wherein frequency changes of the first and second driving signals are independently performed at different times, and the frequency of the first driving signal and the frequency of the second driving signal are changed in different frequency change ranges.

22. The touch controller of claim 21, further comprising: a frequency controller configured to control the first touch driver to drive the touch electrodes in the first sensing area based on a first frequency, and to control the second touch driver to drive the touch electrodes in the second sensing area based on a second frequency different from the first frequency.

23. The touch controller of claim 22, wherein the frequency controller is configured to control the first touch driver and the second touch driver to change the first frequency and the second frequency, respectively, at a predetermined time.

24. The touch controller of claim 23, wherein the predetermined time corresponds to detection of a touch.

25. The touch controller of claim 23, wherein the first touch driver is configured to drive the touch electrodes in the first sensing area independently from the second touch driver driving the touch electrodes in the second sensing area.

26. The touch controller of claim 21, further comprising:
a first multiplexer connected between the first touch driver and the touch electrodes in the first sensing area of the touch panel;
a second multiplexer connected between the second touch driver and the touch electrodes in the second sensing area of the touch panel,
wherein the different frequencies of the first driving signal and the second driving signal reduce electromagnetic interference in a display device including the touch controller.

* * * * *